(12) United States Patent
Kakino et al.

(10) Patent No.: US 7,990,599 B2
(45) Date of Patent: Aug. 2, 2011

(54) BARCODE SCANNING DEVICE AND METHOD FOR PRODUCING HIGH DENSITY SCANNING PATTERN BY THE SAME

(75) Inventors: Tomonari Kakino, Shizuoka-ken (JP); Katsumi Gocho, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/323,398

(22) Filed: Nov. 25, 2008

(65) Prior Publication Data
US 2009/0141329 A1 Jun. 4, 2009

(30) Foreign Application Priority Data
Nov. 26, 2007 (JP) ................................ 2007-304200

(51) Int. Cl.
*G02B 26/08* (2006.01)
(52) U.S. Cl. ............... 359/216.1; 359/205.1; 359/219.2; 235/462.39; 235/462.4
(58) Field of Classification Search .... 359/201.1–201.2, 359/203.1, 216–219.21; 235/462.32–462.33, 235/462.36–462.4
See application file for complete search history.

(56) References Cited

U.S. PATENT DOCUMENTS

| | | | |
|---|---|---|---|
| 5,223,700 A | 6/1993 | Takenaka | |
| 5,268,565 A | 12/1993 | Katoh et al. | |
| 6,581,832 B1 | 6/2003 | Kato et al. | |
| 2003/0201329 A1* | 10/2003 | Kumagai et al. | 235/462.32 |

FOREIGN PATENT DOCUMENTS

| | | |
|---|---|---|
| EP | 0 697 674 A1 | 2/1996 |
| JP | H 06-131490 | 5/1994 |
| WO | WO 98/24046 | 6/1998 |

OTHER PUBLICATIONS 08020449.8-2210 European Search Report dated Apr. 6, 2009.

* cited by examiner

*Primary Examiner* — James Phan
(74) *Attorney, Agent, or Firm* — Patterson & Sheridan, LLP

(57) ABSTRACT

Barcode scanning device (3) includes a rotatable polygon mirror (27) and a first fixed reflection mirror (33). The polygon mirror (27) comprises a first reflection surfaces (c), (e) and a second reflection surfaces (a), (b), (d), (f). The first reflection surfaces (c), (e) reflect laser light and thus emitting first scanning light in a range of ±20° with respect to an optical axis (29). The second reflection surfaces (a), (b), (d), (f) reflect laser light and thus emitting second scanning light in a range larger than ±20° with respect to an optical axis (29). The first fixed reflection mirror (33) reflects the first scanning light and second scanning light forming scanning patterns in an object readable area. These scanning patterns are composed of a plurality of second scanning lines each parallel with other and first scanning lines disposed between the second scanning lines.

12 Claims, 29 Drawing Sheets

|  |  | Disposition angles of fixed reflecting mirrors (degree) | | | | |
| --- | --- | --- | --- | --- | --- | --- |
|  |  | 31 | 32 | 33 | 34 | 35 |
|  |  | −90 ∼ −50 | −50 ∼ −20 | −20 ∼ +20 | +20 ∼ +50 | +50 ∼ +90 |
| Scanning ranges formed by the respective reflective surfaces of the polygon mirror (degree) | $\theta a$ | −90 ∼ −50 | −50 ∼ −20 | −20 ∼ +20 | +20 ∼ +50 | +50 ∼ +90 |
|  | $\theta b$ | −70 ∼ −50 | −50 ∼ −20 | −20 ∼ +20 | +20 ∼ +50 | +50 ∼ +90 |
|  | $\theta c$ | — | — | −20 ∼ +20 | — | — |
|  | $\theta d$ | −70 ∼ −50 | −50 ∼ −20 | −20 ∼ +20 | +20 ∼ +50 | +50 ∼ +70 |
|  | $\theta e$ | — | — | −20 ∼ +20 | — | — |
|  | $\theta f$ | −90 ∼ −50 | −50 ∼ −20 | −20 ∼ +20 | +20 ∼ +50 | +50 ∼ +70 |

FIG. 14

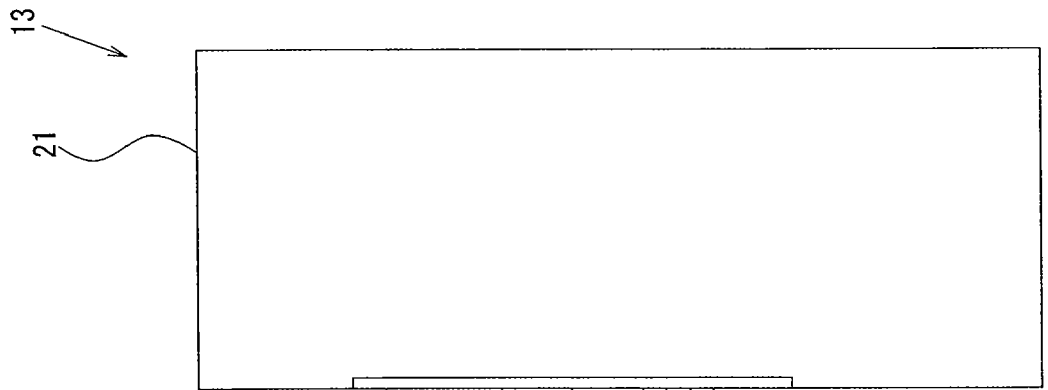
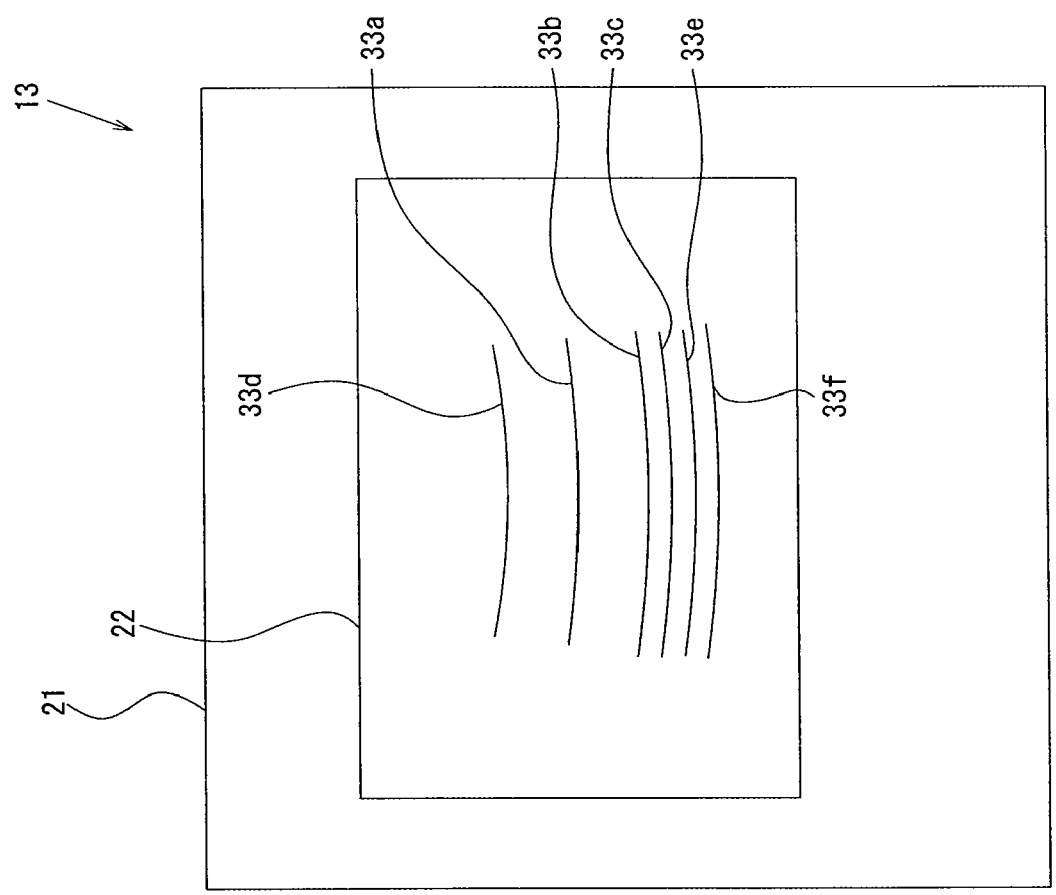

|  |  | Disposition angles of fixed reflecting mirrors (degree) | | | | |
| --- | --- | --- | --- | --- | --- | --- |
|  |  | 31 | 32 | 33 | 34 | 35 |
|  |  | −90 ~ −50 | −50 ~ −20 | −20 ~ +20 | +20 ~ +50 | +50 ~ +90 |
| Scanning ranges formed by the respective reflective surfaces of the polygon mirror (degree) | $\theta g$ | −70 ~ −50 | −50 ~ −20 | −20 ~ +20 | +20 ~ +50 | +50 ~ +90 |
|  | $\theta h$ | — | — | −20 ~ +20 | — | — |
|  | $\theta i$ | −90 ~ −50 | −50 ~ −20 | −20 ~ +20 | +20 ~ +50 | +50 ~ +70 |
|  | $\theta j$ | −70 ~ −50 | −30 ~ −20 | −20 ~ +20 | +20 ~ +50 | +50 ~ +90 |
|  | $\theta k$ | — | — | −20 ~ +20 | — | — |
|  | $\theta l$ | −90 ~ −50 | −50 ~ −30 | −20 ~ +20 | +20 ~ +50 | +50 ~ +70 |

FIG. 24

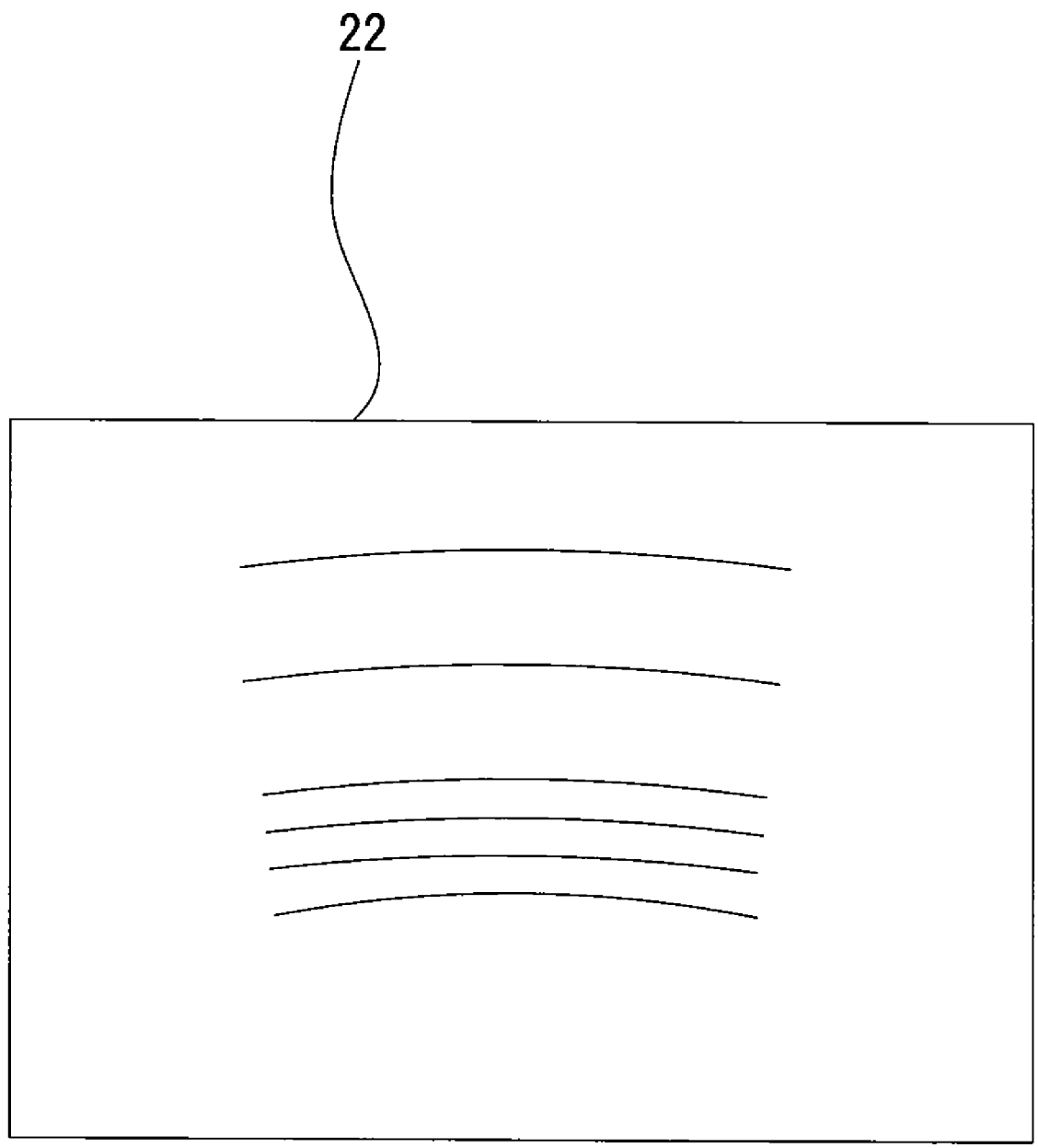
F I G. 2 7

BARCODE SCANNING DEVICE AND METHOD FOR PRODUCING HIGH DENSITY SCANNING PATTERN BY THE SAME

CROSS-REFERENCE TO RELATED APPLICATIONS

This application is based upon and claims the benefit of priority from prior Japanese Patent Application No. 2007-304200, filed Nov. 26, 2007, the entire contents of which are hereby incorporated by reference.

BACKGROUND OF THE INVENTION

1. Field of the Invention

This invention relates, in general, to a barcode scanning device for reading coded information such as a barcode. In particular, the invention relates to a method and apparatus for forming scanning lines in a wide range and forming a high-density scanning pattern by increasing the number of scanning lines in a key area within the range.

2. Description of the Related Art

Conventionally, there have been known a barcode scanning device having a read window in front capable of reading a barcode affixed to a commodity by scanning light transmitted through the read window.

For example, U.S. Pat. No. 6,581,832 discloses a barcode scanning device comprising a read window, a light source, a reflecting mirror, a polygon mirror, and a group of fixed mirrors. In this barcode scanning device, a light beam emitted from a light source is reflected by a polygon mirror and a group of fixed mirrors, and is output through a read window as scanning light.

This scanning light forms a scanning pattern consisting of three horizontal scanning lines, a scanning pattern consisting of symmetrical cross-lines each side of the pattern having three scanning lines (total of six lines), and a v-shaped scanning pattern having lines steeper than those of the cross-line pattern each consisting of three scanning lines (total of six lines).

A disadvantage of the above barcode scanning device is that, because the three scanning lines of the respective scanning patterns are equally spaced, when a commodity is held being tilted from a plane in parallel with the read window, the lines of the scanning patterns formed on a commodity become sparsity.

Particularly, when a commodity is held so that a surface of a barcode affixed to the commodity is positioned in substantially vertical position relative to the read window, the reading performance of the barcode remarkably degrades.

Therefore, such a barcode scanning device is not suitable to the use for reading barcodes of commodities whose contents tend to be crumbled in shape when inclined, for example, those packed in a tray such as fishes, meat, and precooked foods.

BRIEF SUMMARY OF THE INVENTION

Accordingly, an object of the present invention is to provide a device and method capable of reliably reading a barcode affixed to the upper surface of commodities without the needs of inclining the commodities, e.g., those packed in a tray.

To accomplish the above object, a barcode scanning device according to one embodiment of the present invention, which scans an encoded information such as a barcode in an information reading area, comprises: a housing having a read window;

a light source for emitting a light beam, the light source being accommodated within the housing;

a polygon mirror rotatably accommodated within the housing, wherein the polygon mirror comprises a first reflective surface and more than one second reflective surface, the first reflective surface reflecting the light beam in an angle range of $\theta 1$ producing first scanning light, the second reflective surface reflecting the light beam in an angle range larger than $\theta 1$ producing second scanning light, the angles defined by the respective first reflective surface and second reflective surface with respect to a rotation axis of the polygon mirror each being different from another;

a first fixed mirror accommodated within the housing, wherein the first fixed mirror reflects both the first scanning light and the second scanning light to exterior of the housing through the read window to form a first scanning pattern for reading encoded information in the information reading area formed on a plane orthogonal to the read window, the first scanning pattern comprising more than one second scanning line in practically parallel with each other and a first scanning line in practically parallel with the second scanning line, wherein the first scanning line comprises a trajectory depicted by the first scanning light reflected from the first fixed mirror in the information reading area while the more than one second scanning line comprise trajectories depicted by the second scanning light reflected from the first fixed mirror in the information reading area; and one or more second fixed mirrors disposed adjacent the first fixed mirror, wherein the second fixed mirrors reflect only the second scanning light to exterior of the housing through the read window to form a second scanning pattern adjacent the first scanning pattern for reading encoded information in the information reading area, the second scanning pattern comprising more than one third scanning line in practically parallel with each other wherein the third scanning line comprises trajectories depicted in the information reading area by the second scanning light reflected from the second fixed mirrors.

BRIEF DESCRIPTION OF THE SEVERAL VIEWS OF THE DRAWING

This and other objects and advantages of this invention will become apparent and more readily appreciated from the following detailed description of the presently preferred exemplary embodiments of the invention taken in conjunction with the accompanying drawings wherein:

FIG. 14 is a table that shows the relationships between scanning ranges formed by the respective reflective surfaces of the polygon mirror and disposition angles of fixed reflecting mirrors corresponding to the respective reflective surfaces;

FIG. 20 shows diagrams for illustrating the relation between scanning light reflected from fixed reflecting mirror 33 and a transverse-type scanning pattern;

FIG. 24 is a table that shows the relationship between scanning ranges of the respective reflective surfaces of the polygon mirror shown in FIG. 23 and disposition angles of fixed reflecting mirrors corresponding to the respective reflective surfaces;

FIG. 27 is a diagram showing a transverse-type scanning pattern among the scanning patterns of FIG. 26.

DETAILED DESCRIPTION OF THE INVENTION

Figure 1:
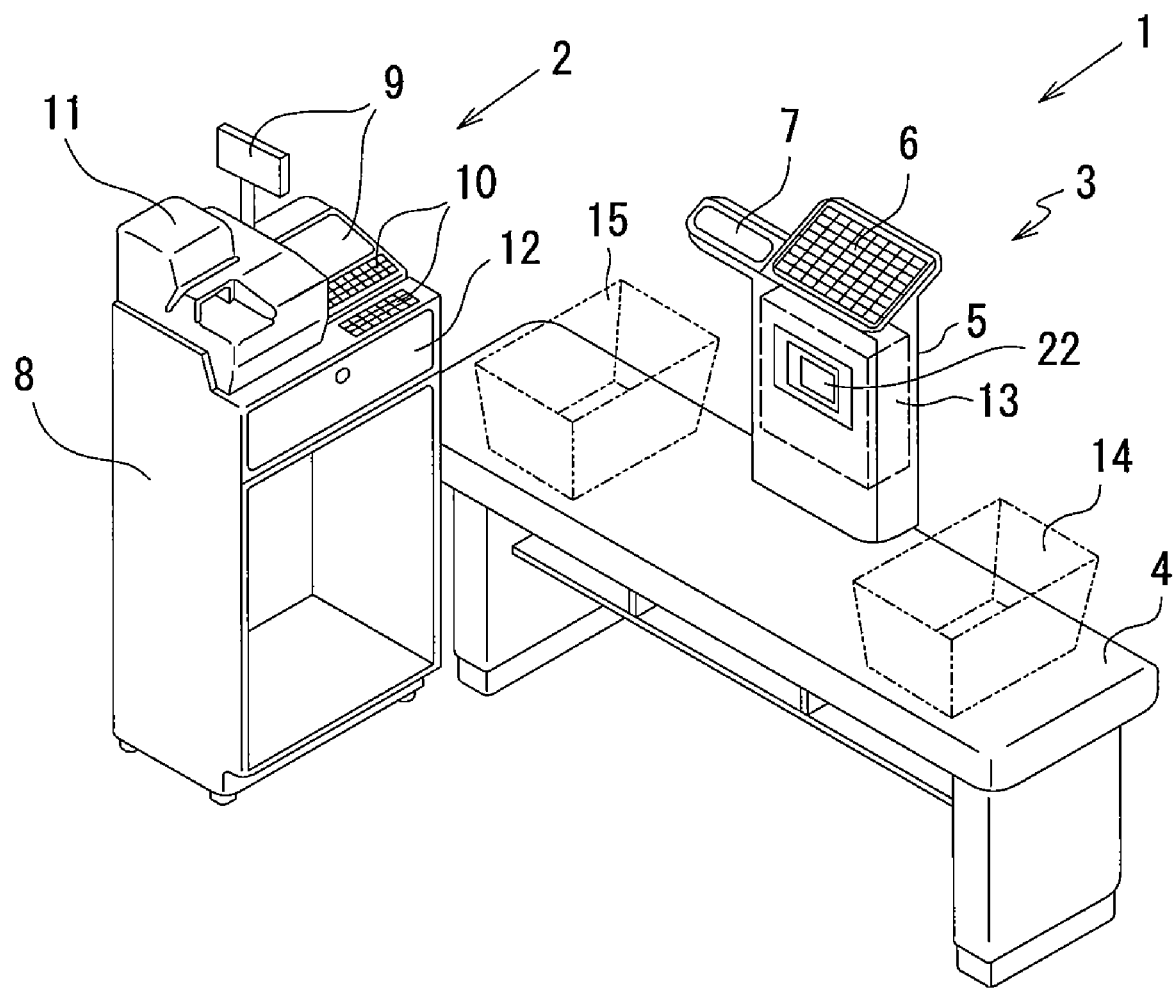
FIG. 1 is a perspective view showing a checkout system comprising a barcode scanning device according to one embodiment of the present invention.

Preferred embodiments of the present invention will now be described in more detail with reference to the accompanying drawings. However, the same numerals are applied to the similar elements in the drawings, and therefore, the detailed descriptions thereof are not repeated.

First Embodiment

Hereinafter, one embodiment according to the present invention will be described in reference to FIGS. 1 through 21.

FIG. 1 shows a checkout system 1 comprising a barcode scanning device according to one embodiment of the present invention. This checkout system comprises an electronic cash register 2, a barcode scanning device 3, a checkout counter 4, a keyboard 6, and a display device 7.

Electronic cash register 2 is provided at the downstream in the moving direction of a commodity and customer in checkout system 1.

On checkout counter 4, a shopping basket containing various commodities each bearing a barcode label, etc. is placed. Barcode scanning device 3 stands in the middle of checkout counter 4. Keyboard 6 is provided on the top of barcode scanning device 3, and used by an operator for entering data as needed. Display device 7 is provided on the top of barcode scanning device 3 adjacent keyboard 6, displaying various information items.

Electronic cash register 2 performs accounting processing for a customer while operated by the operator. Electronic cash register 2 is comprised of a main body housing 8, a display device 9 for displaying various information items, a data-entry keyboard 10, an R/J printer 11 for printing various data, and a drawer 12 for storing money.

Now, there will be described in detail barcode scanning device 3 according to this embodiment as the principal part of the present invention.

Barcode scanning device 3 according to the embodiment is vertically disposed on checkout counter 4 as shown in FIG. 1. Barcode scanning device 3 is comprised of a housing 5 disposed on checkout counter 4 and a barcode scanner unit 13 accommodated in the housing 5.

Barcode scanner unit 13 includes a read window 22 and a control section (not shown) provided within housing 5. The read window 22 is exposed from housing 5. The surface of read window 22 is disposed generally vertically on checkout counter 4.

Barcode scanner unit 13 emits scanning light through read window 22 to read a barcode from a barcode label affixed on a commodity. The control section is of a well known type incorporating a CPU internally, which analyzes barcode information read by barcode scanner unit 13 and transmits the analysis result to, for example, a store server.

Figure 2A:
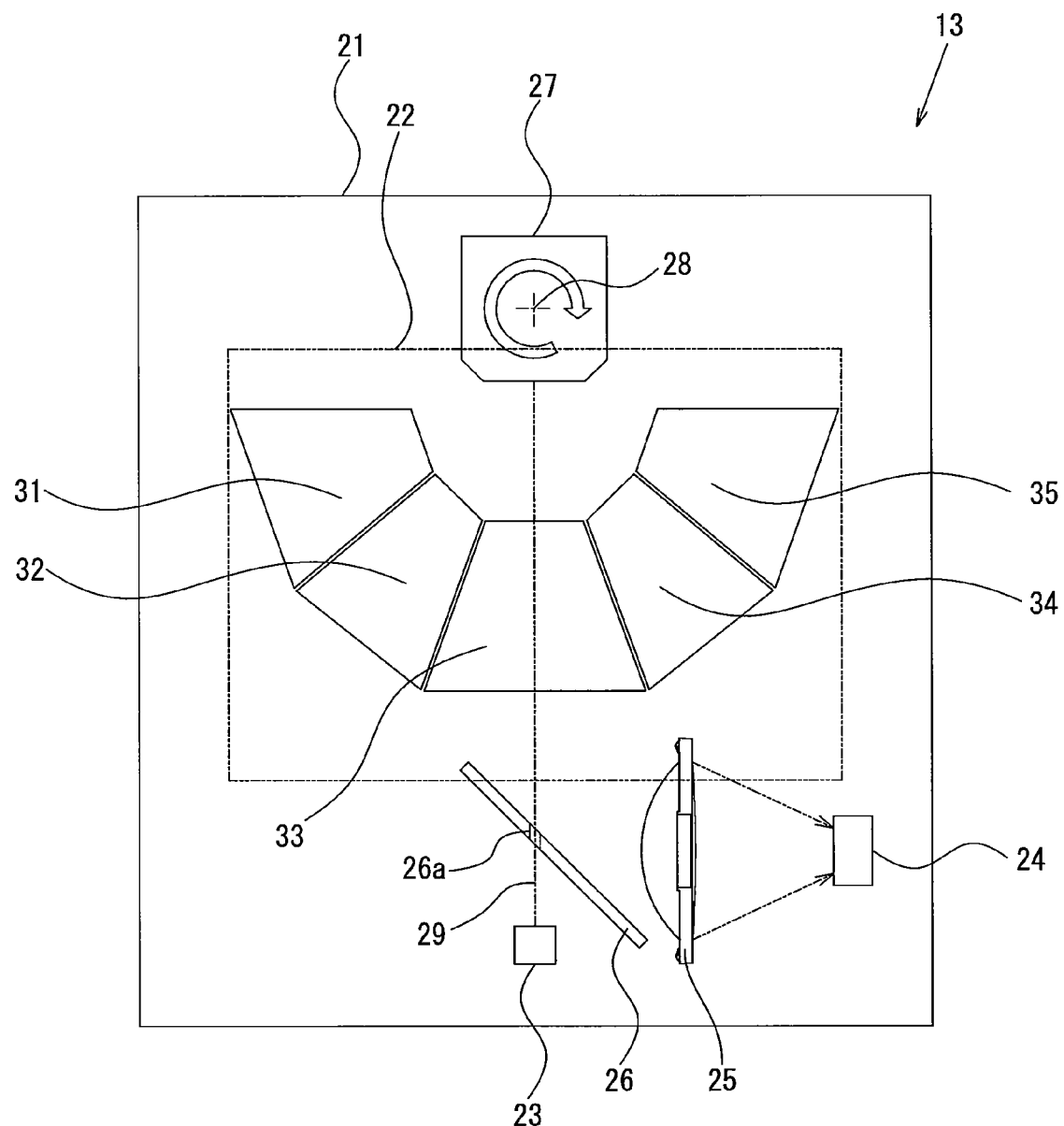
FIG. 2 is a diagram illustrating an internal structure of the barcode scanning device of FIG. 1.
Figure 2B:
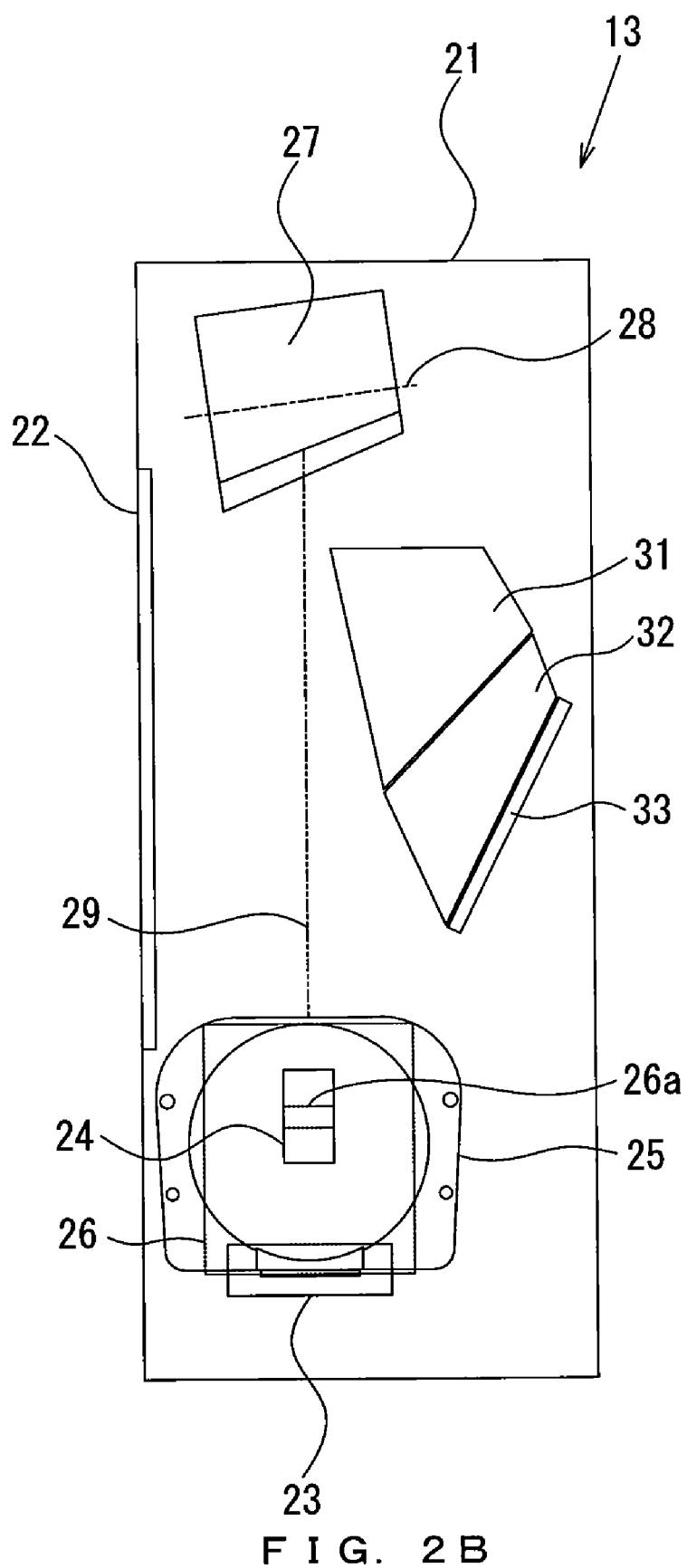

FIGS. 2A and 2B illustrate an internal structure of barcode scanner unit 13. Referring to FIG. 2A, barcode scanner unit 13 has a housing 21. Housing 21 accommodates a light source 23, a polygon mirror 27, five fixed reflecting mirrors 31-35, a mirror 26 having an aperture 26a, a condenser 25, and a light-receptor section 24.

Light source 23, e.g. a laser diode, emits a laser beam as a light beam. Light source 23, which is provided at a lower part of housing 21, emits a laser beam towards polygon mirror 27. The laser beam emitted passes through aperture 26a and arrives at polygon mirror 27 as depicted in FIGS. 2A and 2B.

Figure 3:
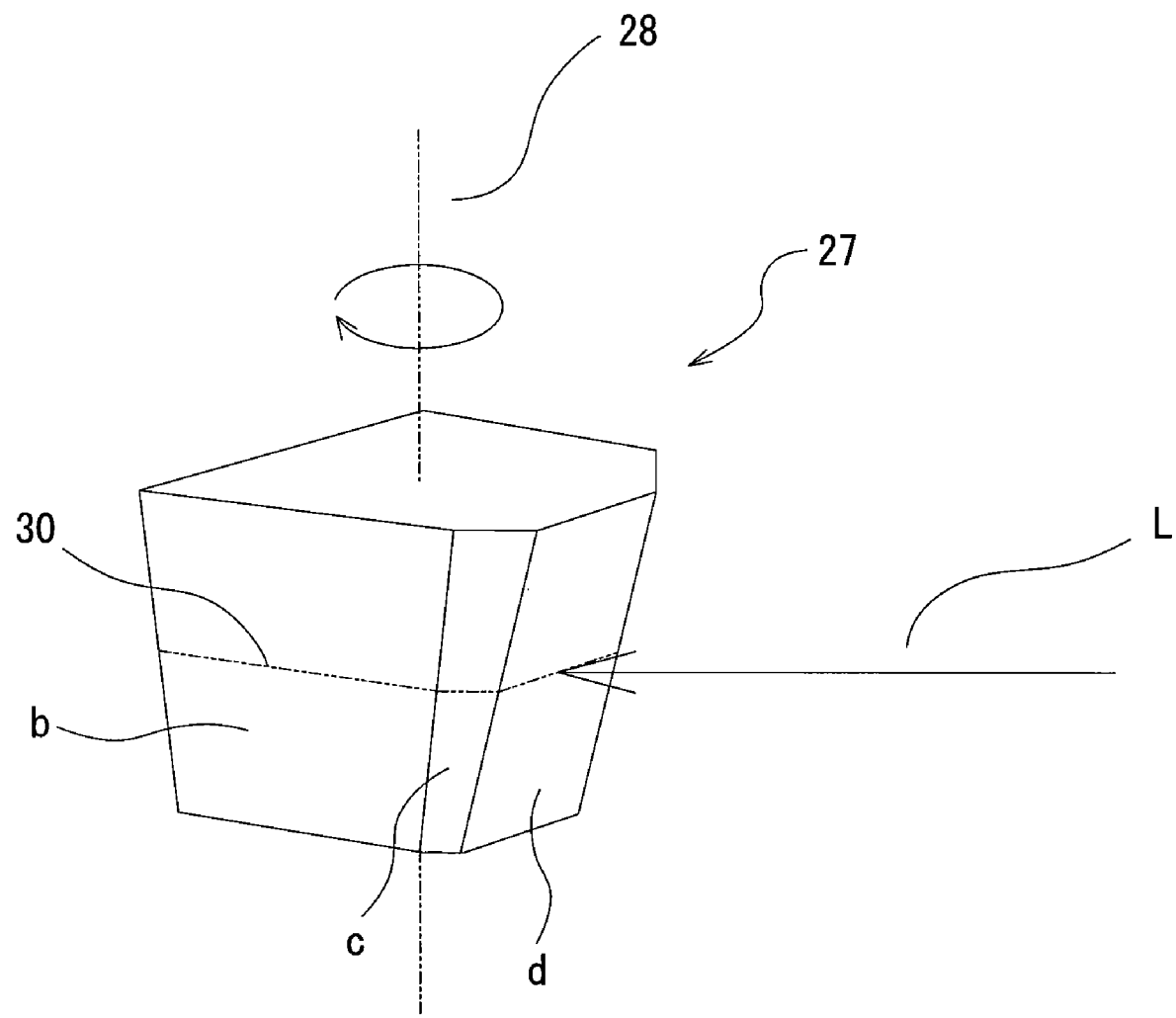
FIG. 3 is a perspective view illustrating a polygon mirror provided in the barcode scanning device.
Figure 4:
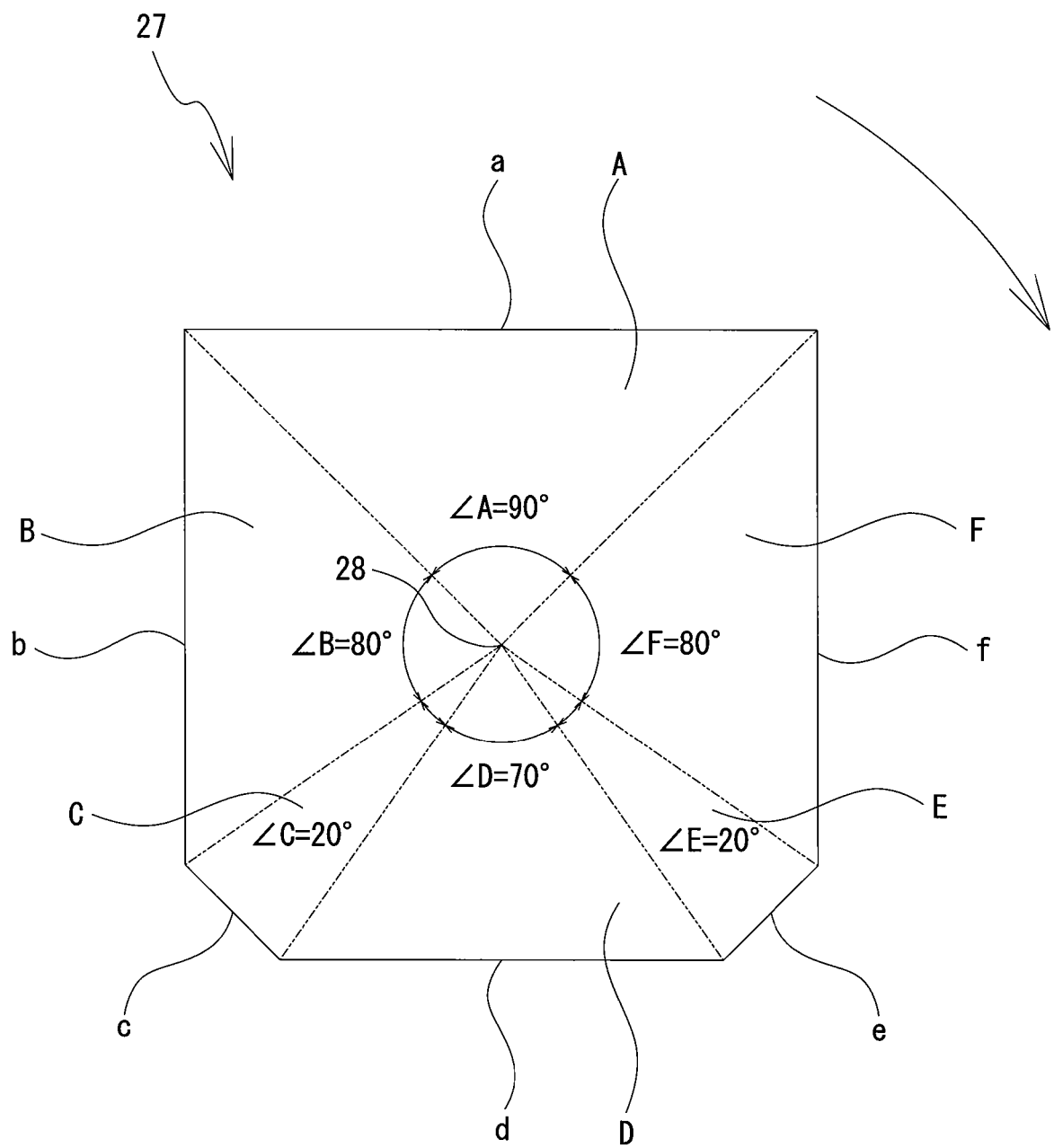
FIG. 4 is a transverse section of the polygon mirror wherein the polygon mirror is transversely cut at a laser beam striking part.

Polygon mirror 27 is connected to a motor (not shown) so as to rotate on a rotation axis 28, while deflecting the laser beam. As shown in FIGS. 3 and 4, polygon mirror 27 has multiple reflective surfaces a-f on its side. Virtual lines indicated by reference numerals a-f in FIG. 15B are representative of the multiple reflective surfaces a-f superimposed on a plane. As can be seen from the FIGURE, the multiple reflective surfaces a-f have different gradients (oblique angle) relative to rotation axis 28. According to these different gradients, the laser beam is reflected being deflected in vertically different directions with respect to rotation axis 28. In this embodiment, because six reflective surfaces are provided, polygon mirror 27 reflects and deflects the laser beam in six directions. Then, the scanning light reflected from reflective surfaces a-f proceed towards fixed reflecting mirrors 31~35.

Figure 17:
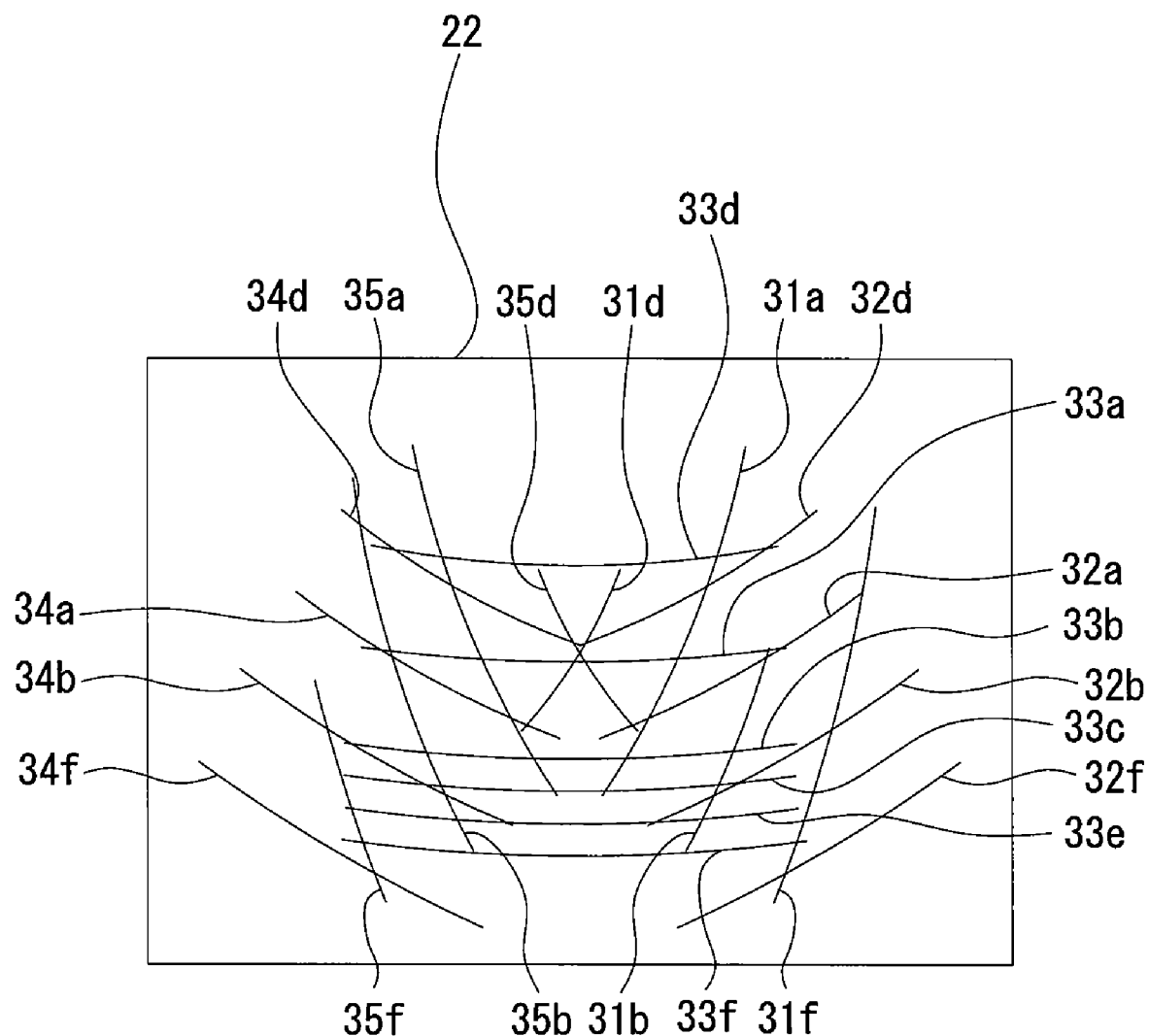
FIG. 17 shows scanning patterns transmitting through a read window viewed from inside of a housing body towards the window.

The scanning light reflected from reflective surfaces a-f transmits through a read window 22 and is projected to an open space (a barcode reading area orthogonal to the read window). Since the scanning light is split into several directions, when the beams are applied to an object (commodity), scanning patterns having multiple scanning lines are formed. FIG. 17 depicts an example of scanning patterns transmitting through read window 22. When a commodity is carried into this reading area by an operator, the scanning light intersects a barcode affixed to the commodity to scan the barcode. The scanning light that has scanned the barcode on the commodity is modulated according to the barcode and scattered. A part of the scanning light enters housing 21 through read window 22 as returned light containing the barcode information. The returned light that entered thereto is reflected from the reflective surfaces of fixed reflecting mirrors 31~35 towards polygon mirror 27. The returned light reflected from the reflective surfaces a-f of polygon mirror 27 arrives at mirror 26.

Polygon mirror 27 and fixed reflecting mirrors 31-35 will be described in detail later.

There is formed a reflective surface in the surrounding area of aperture 26a through which the laser beam has been emitted from light source 23. This reflective surface reflects the incident returned light further to condenser 25.

Condenser 25 converges the returned light so as to focus them substantially on light-receptor section 24. Light-receptor section 24 converts the returned light, containing the barcode information, which is received by condenser 25 into an electrical signal and outputs the electrical signal to a well-known control section (not shown). Through a series of such operations, the information contained in the barcode affixed to a commodity is read by barcode scanning device 3.

Polygon mirror 27 and fixed reflecting mirrors 31-35 will now be described in more detail.

Referring to FIG. 3, polygon mirror 27 has the multiple reflective surfaces a-f disposed horizontally in the circumferences on the center of rotation axis 28. Polygon mirror 27 rotates clockwise (the arrow direction) in FIG. 3. The laser beam L emitted from light source 23 is reflected at laser-beam striking parts 30 on the reflective surfaces a-f. As described earlier, these reflective surfaces a-f reflects laser beam L at reflection angles according to the respective oblique angles as illustrated in FIG. 15B, and the produced scanning light arrives at fixed reflecting mirrors 31~35.

Referring to FIG. 2, fixed reflecting mirrors 31-35 are disposed symmetrically relative to fixed reflecting mirror 33. Disposed adjacent to each other on the both sides of fixed reflecting mirror 33 are fixed mirrors 32 and 34. Disposed further adjacent to fixed mirrors 32 and 34 are fixed reflecting mirrors 31 and 35, respectively.

Figure 15:
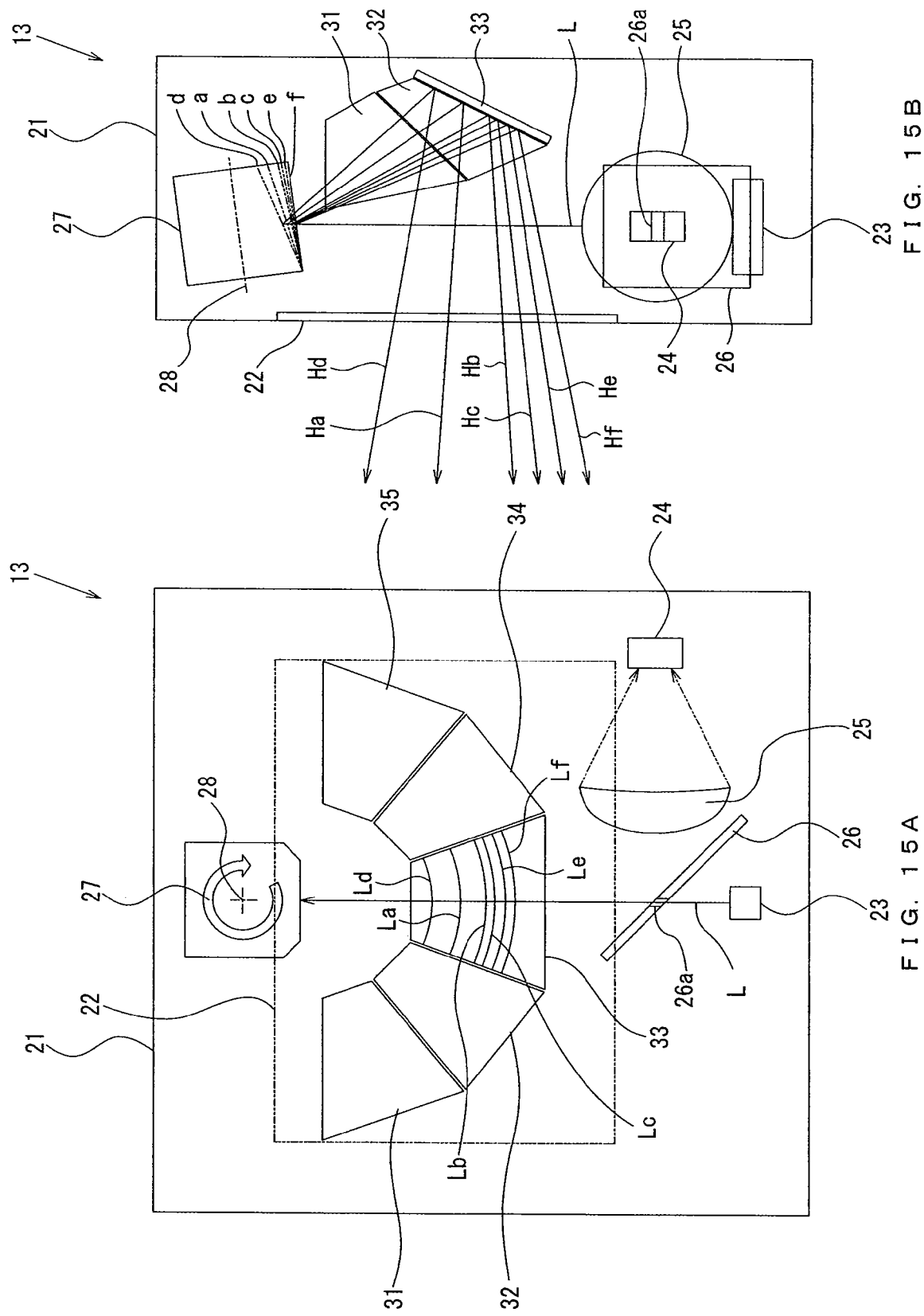
FIG. 15 shows a status of reflection of the scanning light by a common fixed mirror 33.
Figure 16:
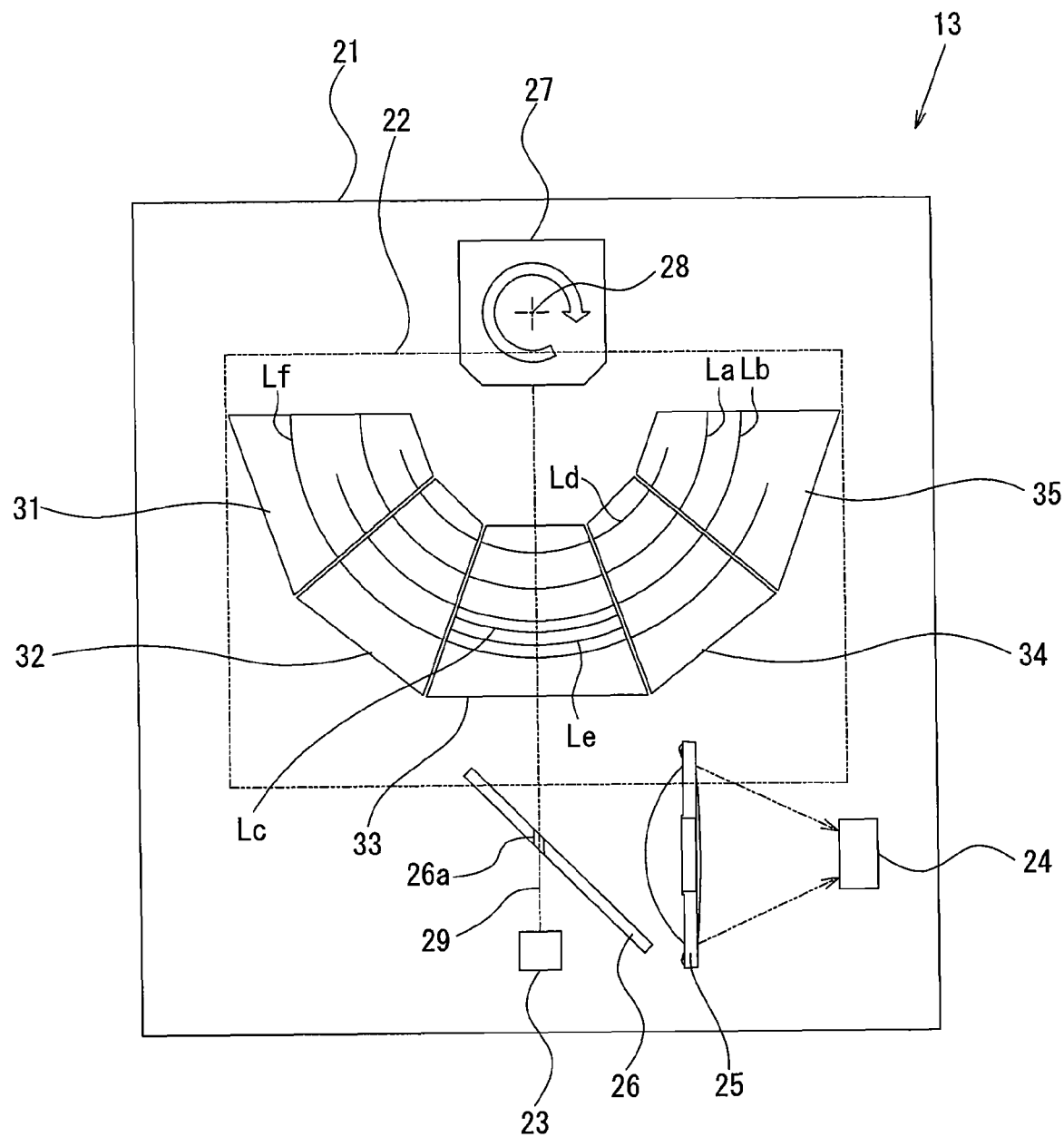
FIG. 16 is a diagram showing trajectories depicted by the scanning incident to the respective fixed reflecting mirrors.

FIG. 16 shows trajectories La-Lf depicted by scanning light incident to fixed reflecting mirrors 31~35. That is, the scanning light reflected from reflective surface a depicts a trajectory La as polygon mirror 27 rotates; the scanning light reflected from reflective surface b depicts a trajectory Lb. Similarly, hereinafter, reflective surface c and trajectory Lc, reflective surface d and trajectory Ld, reflective surface e and trajectory Le, and reflective surface f and trajectory Lf correspond to each other in the respective combinations. Trajectories La to Lf are formed from top in the order of Ld, La, Lb, Lc, Lf in fixed reflecting mirrors 31~35. These vertical positions correspond to oblique angles of the reflective surfaces a-f relative to rotation axis 28 of polygon mirror 27. That is, in FIG. 15B, there are provided reflective surface d, reflective surface a, reflective surface b, reflective surface c, reflective surface e, and reflective surface f, in the order from the greatest oblique angle, and this order of the oblique angle corresponds to the aforementioned positional order of the trajectories Ld-Lf.

A scanning range produced by laser light L along with the rotation of polygon mirror 27 is determined associated with each of the reflective surfaces a-f. The relationship between each of the reflective surfaces a-f and a corresponding scanning range will be described below in reference to FIGS. 4-14.

FIG. 4 shows a virtual cross section, forming a hexagon, wherein polygon mirror 27 is cut across at laser-beam striking part 30. If lines are drawn between rotation axis 28 and the respective apexes of the hexagonal in this virtual cross section, virtual triangles A-F are formed. The triangles A-F are formed with reflective surfaces a-f as the respective bases and rotation axis 28 as their apexes. The apex angle of a virtual triangle A is 90°; the apex angles of virtual triangles B and F are each 80°; apex angles of virtual triangles C and E are each 20°; and apex angle of a virtual triangle D is 70°. Virtual triangles A, C, D, E each form an isosceles triangle, while virtual triangles B and F each form an inequilateral triangle.

Figure 5:
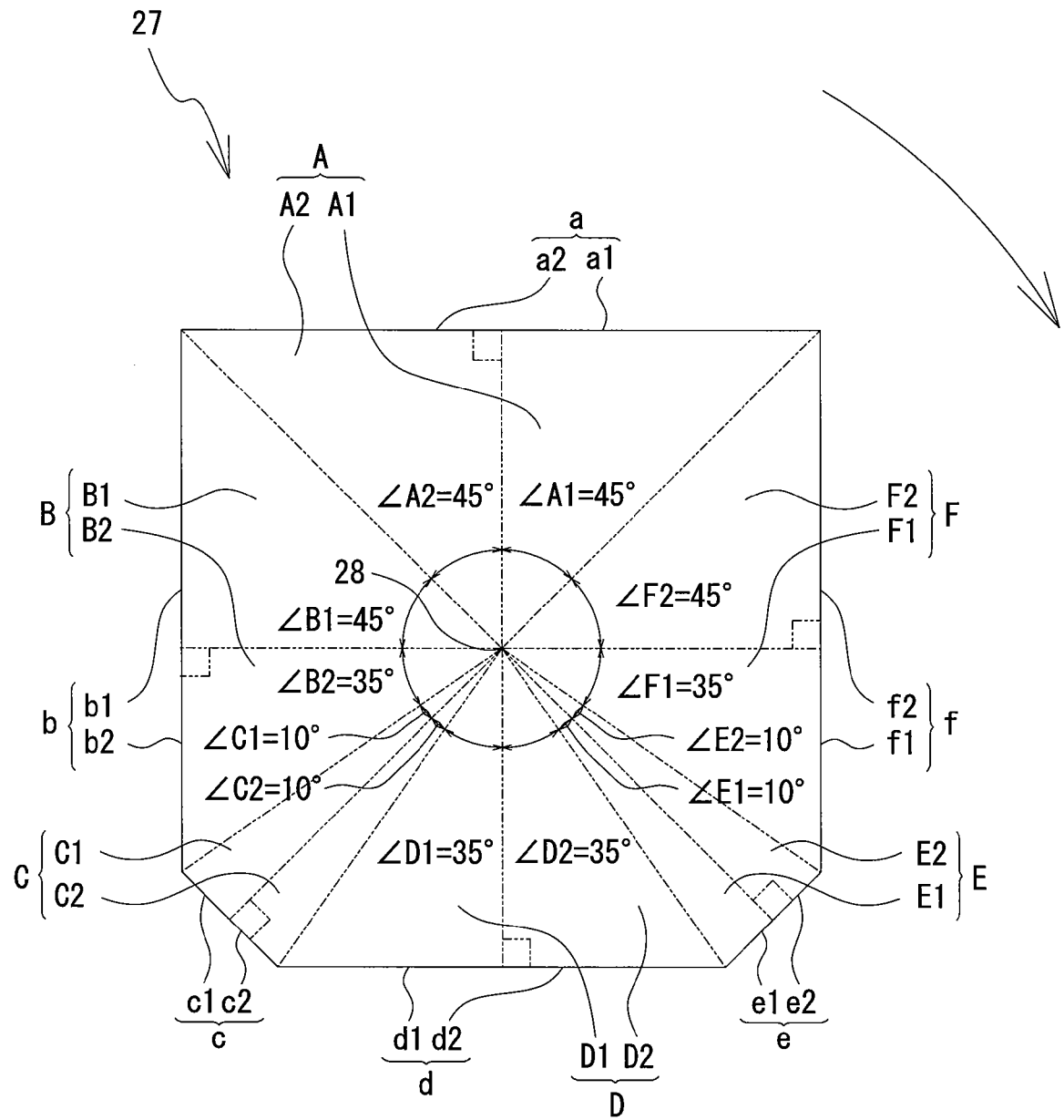
FIG. 5 is a diagram for illustrating the virtual transverse section of FIG. 4.

FIG. 5 is a figure formed by dropping a perpendicular line from rotation axis 28 to the respective bases in virtual triangles A-F. Referring to FIG. 5, virtual triangles A-F are divided into virtual triangles A1, B1, C1, D1, E1, F1 having bases of a1, b1, c1, d1, e1, f1, and apex angles A1, B1, C1, D1, E1, F1, respectively. They are also divided into virtual triangles A2, B2, C2, D2, E2, F2 having bases of a2, b2, c2, d2, e2, f2, and apex angles of A2, B2, C2, D2, E2, F2, respectively. Among them, since triangles A, C, D, E each form an isosceles triangle, apex angles of triangles A2, C2, D2, E2 are equal to those of A1, C1, D1, E1, respectively. That is, angle A1=angle A2=45°; angle C1=angle C2=10°; angle D1=angle D2=35°; angle E1=angle E2=10°.

Meanwhile, since triangles B, F are inequilateral triangles, the apexes of triangles B1, F1 are different from those of triangles B2, F2. That is, angle B1=45°, while angle B2=35° (angle B1≠angle B2); angle F1=35°, while angle F2=45° (angle F1≠angle F2).

Figure 6:
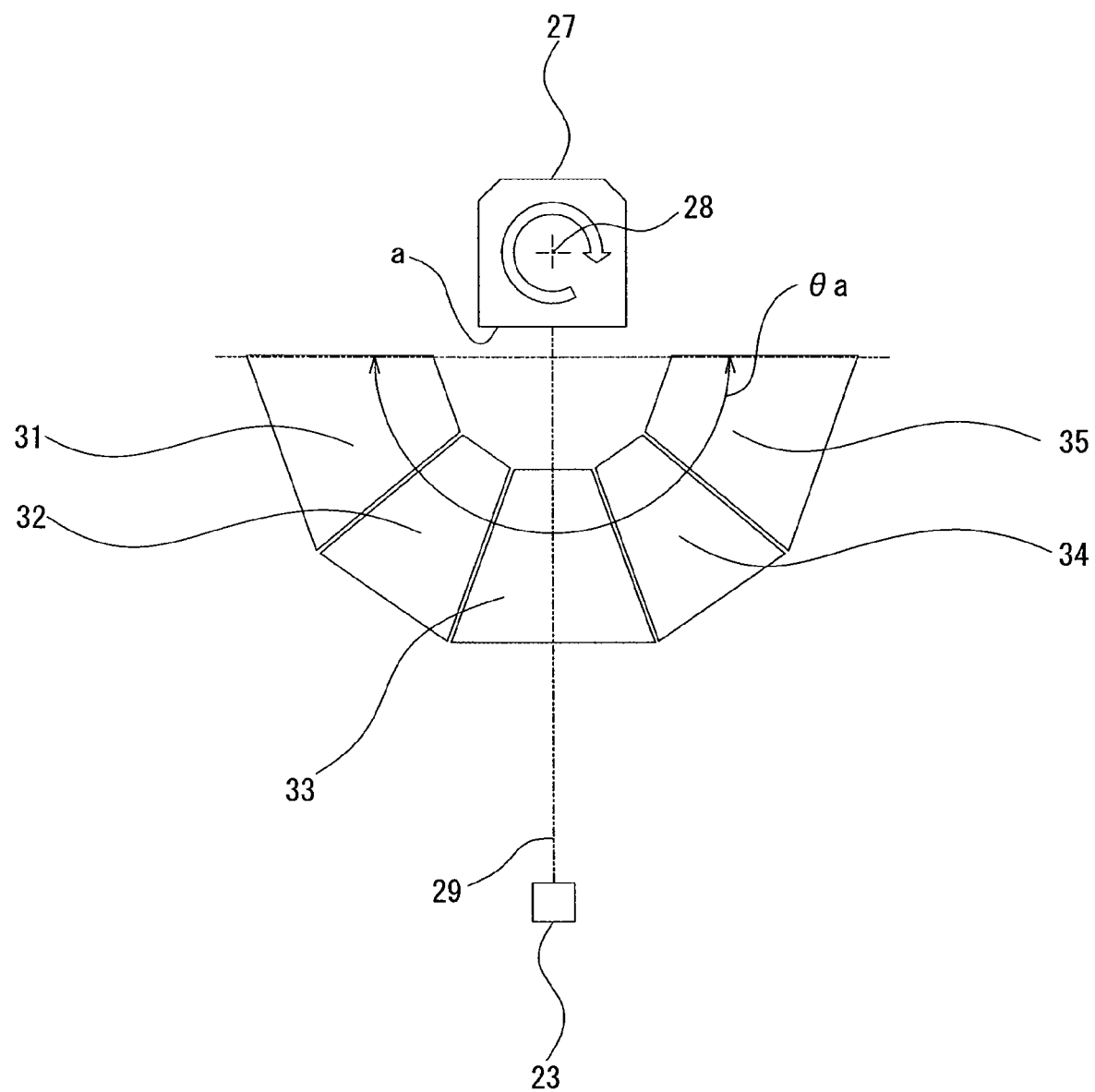
FIG. 6 is a diagram for illustrating a scanning range formed by a reflective surface a of the polygon mirror.

FIG. 6 shows a scanning range formed by laser beam L on fixed reflecting mirrors 31-35 along with the movement of the reflective surface a. θa represents that scanning range, which has an angle ranges between −90° and +90°, i.e. of 180°, in respect to optical axis 29 over fixed reflecting mirrors 31-35, as shown in Table of FIG. 14. Rotation axis 28 of polygon mirror 27 and optical axis 29 of laser beam L are related each other in their positions so that the two axes intersect each other. Therefore, scanning range θa corresponds to the largeness of apex angle A of virtual triangle A (refer to FIG. 4). That is, it holds the following relation: scanning range θa=apex angle A×2=90°×2=180°. Also, the angle range between 0° and +90° on the right to optical axis 29 corresponds to the largeness of apex angle A1 of virtual triangle A1 (refer to FIG. 5). That is, it holds the following relation: the scanning range 90° on the right=apex angle A1×2=45°× 2=90°. Similarly, the angle range between 0° and −90° on the left relative to optical axis 29 corresponds to the largeness of apex angle A2 of virtual triangle A2. That is, it holds the following relation: the left scanning range 90°=apex angle A2×2=45°×2=90°.

Figure 7:
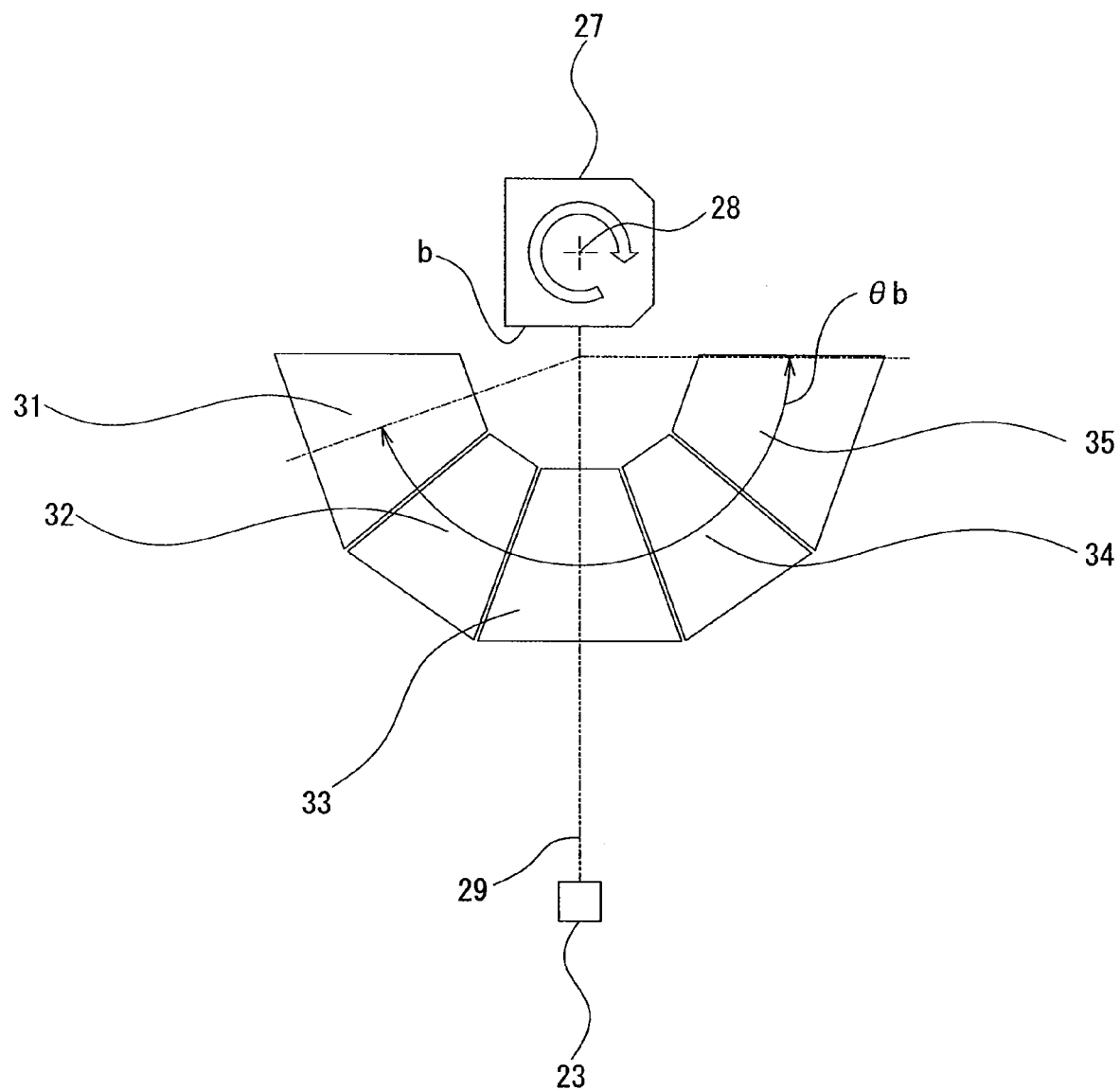
FIG. 7 is a diagram for illustrating a scanning range formed by a reflective surface b of the polygon mirror.

FIG. 7 shows a scanning range formed associated with the movement of the reflective surface b. θb represents that scanning range, which has an angle range between −70° and +90°, i.e. of 160°, in respect to optical axis 29 over fixed reflecting mirrors 31-35, as shown in Table of FIG. 14. This scanning range θb corresponds to the largeness of apex angle B of virtual triangle B. That is, it holds the following relation: scanning range θb=apex angle B×2=80°×2=160°. Also, the angle range between 0° and +90° on the right to optical axis 29 corresponds to the largeness of apex angle B1 of virtual triangle A1. That is, it holds the following relation: the scanning range 90° on the right=apex angle B1×2=45°×2=90°. Similarly, the angle range between 0° and −70° on the left relative to optical axis 29 corresponds to the largeness of apex angle B2 of virtual triangle B2. That is, it holds the following relation: the left scanning range 70°=apex angle B2×2=35°×2=70°.

Figure 8:
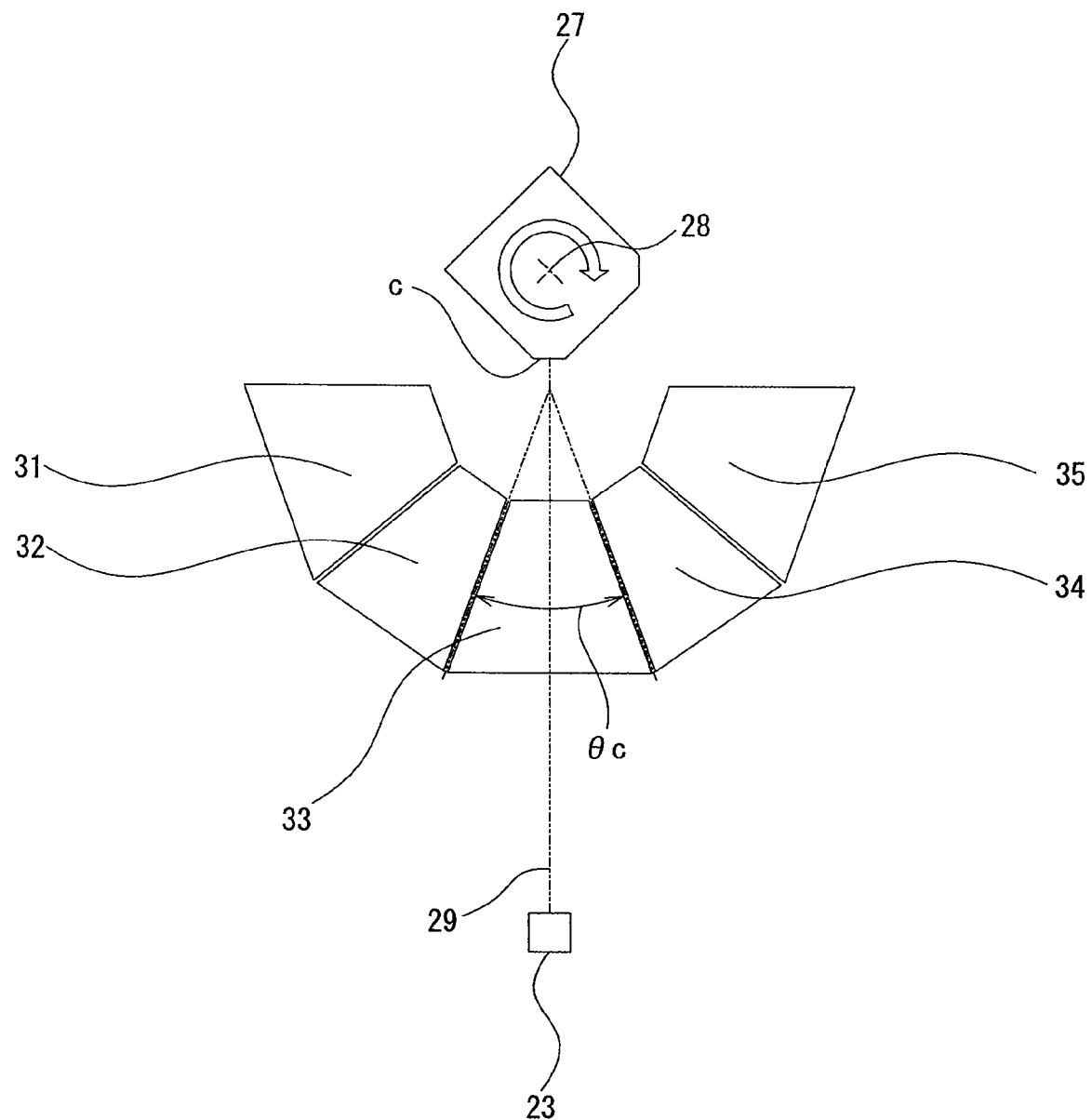
FIG. 8 is a diagram for illustrating a scanning range formed by a reflective surface c of the polygon mirror.

FIG. 8 shows a scanning range formed associated with the reflective surface c. θc represents that scanning range, which has an angle ranges between −20° and +20°, i.e. of 40°, in respect to optical axis 29 only on fixed reflecting mirror 33, as shown in Table of FIG. 14. This scanning range θc corresponds to the largeness of apex angle C of virtual triangle C. That is, the following relation holds: scanning range θc=apex angle C×2=20°×2=40°. Also, the angle range between 0° and +20° on the right to optical axis 29 corresponds to the largeness of apex angle C1 of virtual triangle C1. That is, it holds the following relation: the scanning range 20° on the right=apex angle C1×2=10°×2=20°. Similarly, the angle range between 0° and −20° on the left relative to optical axis 29 corresponds to the largeness of apex angle C2 of virtual triangle C2. That is, the following relation holds: the left scanning range 20°=apex angle C2×2=10°×2=20°.

Figure 9:
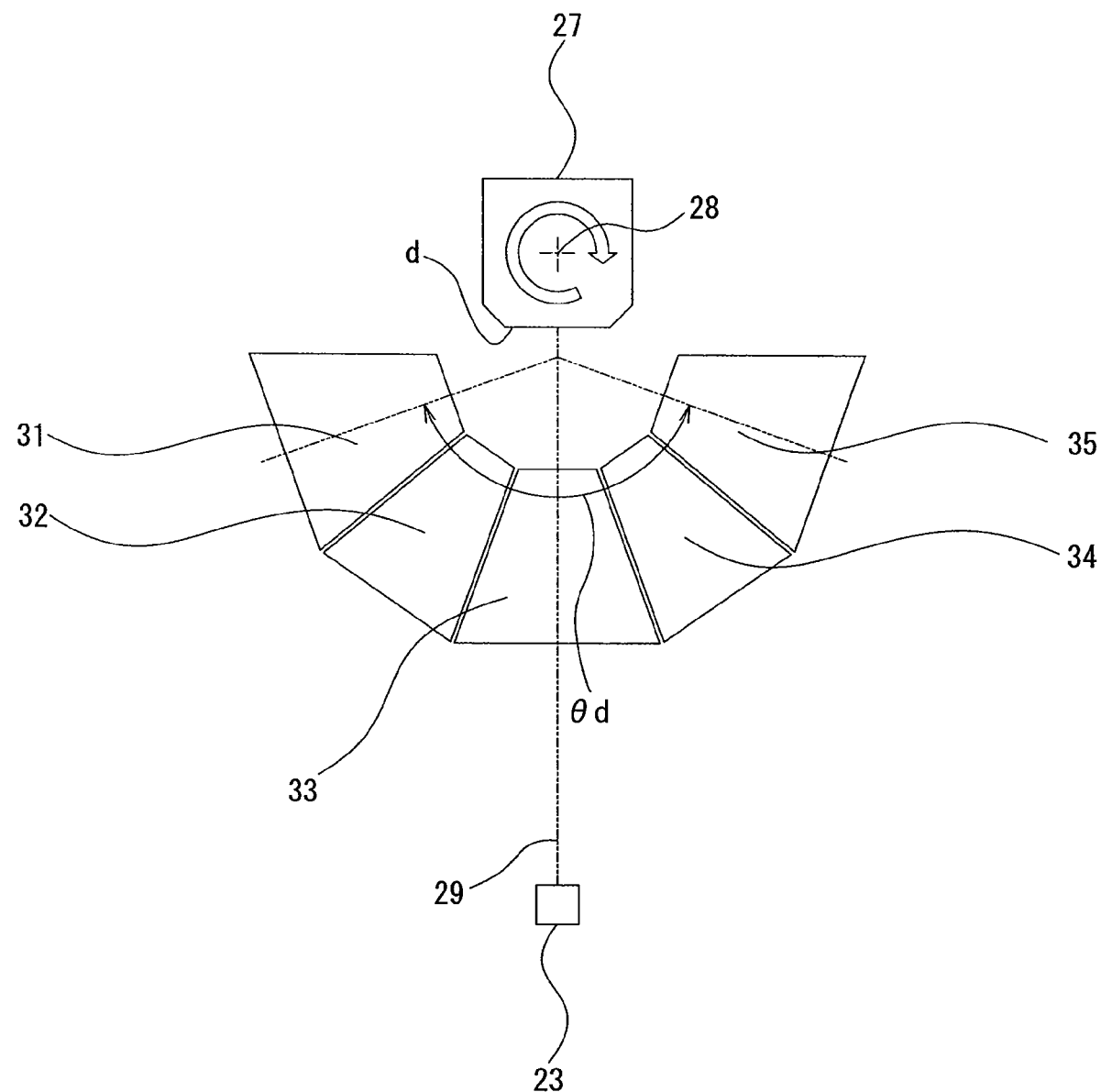
FIG. 9 is a diagram for illustrating a scanning range formed by a reflective surface d of the polygon mirror.

FIG. 9 shows a scanning range formed along with the movement of the reflective surface c. θd represents that scanning range, which has an angle ranges between −70° and +70°, i.e. of 140°, in respect to optical axis 29 over fixed reflecting mirrors 31-35, as shown in Table of FIG. 14. This scanning range θd corresponds to the largeness of apex angle D of virtual triangle D. That is, it holds the following relation: the scanning range θd=apex angle D×2=70°×2=140°. Also, the angle range between 0° and +70° on the right to optical axis 29 corresponds to the largeness of apex angle D1 of virtual triangle D1. That is, it holds the following relation: the scanning range 70° on the right=apex angle D1×2=35°×2=70°. Similarly, the angle range between 0° and −70° on the left relative to optical axis 29 corresponds to the largeness of apex angle D2 of virtual triangle D2. That is, it holds the following relation: the left scanning range 70°=apex angle D2×2=35°×2=70°.

Figure 10:
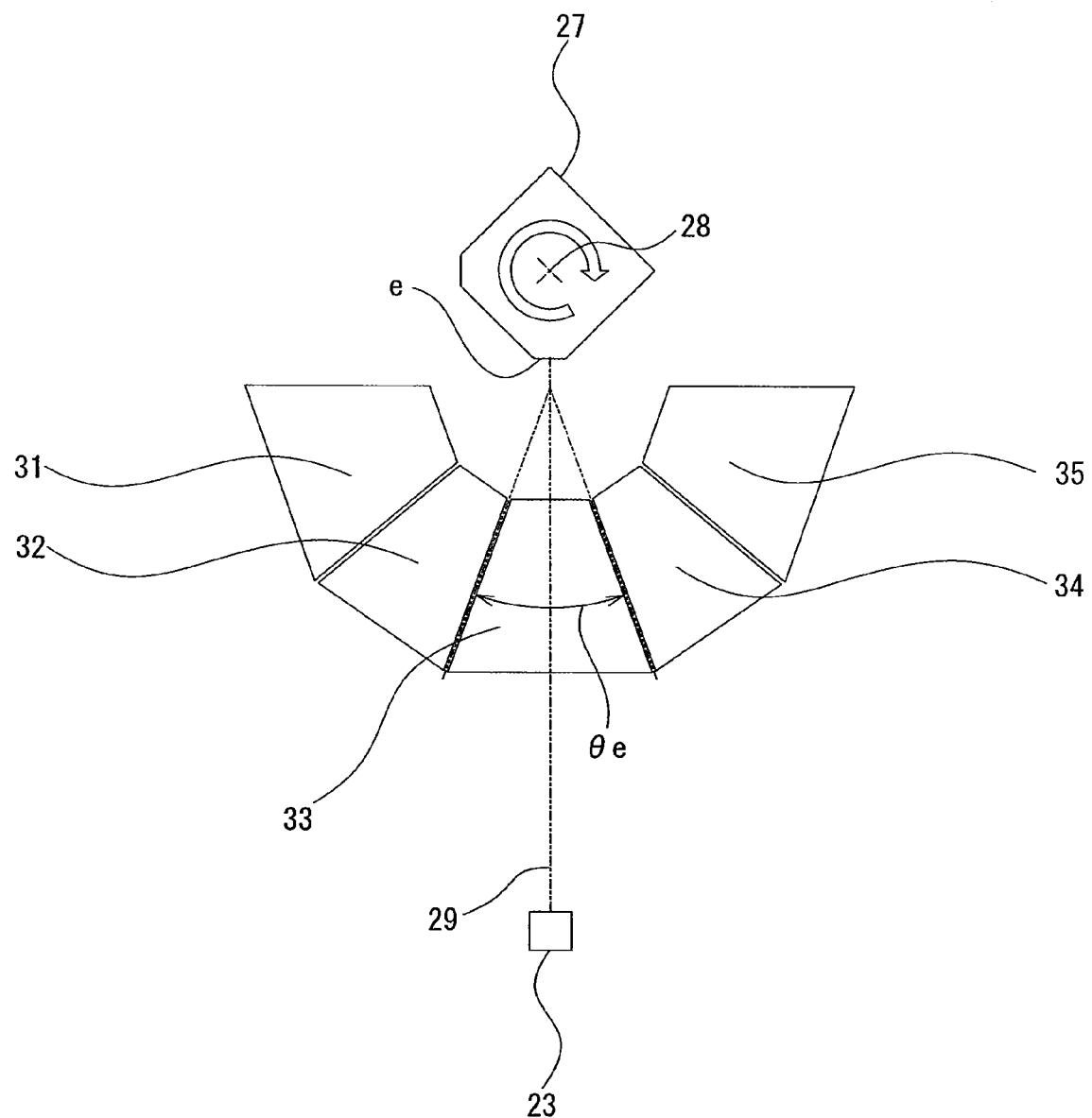
FIG. 10 is a diagram for illustrating a scanning range formed by a reflective surface e of the polygon mirror.

FIG. 10 shows a scanning range formed along with the movement of the reflective surface e. θe represents that scanning range, which has an angle ranges between −20° and +20°, i.e. of 40°, in respect to optical axis 29 only on fixed reflecting mirror 33, as shown in Table of FIG. 14. This scanning range θe corresponds to the largeness of apex angle E of virtual triangle E. That is, it holds the following relation: scanning range θe=apex angle E×2=20°×2=40°. Also, the angle range between 0° and +20° on the right to optical axis 29 corresponds to the largeness of apex angle E1 of virtual triangle E1. That is, it holds the following relation: the scanning range 20° on the right=apex angle E1×2=10°×2=20°. Similarly, the angle range between 0° and −20° on the left relative to optical axis 29 corresponds to the largeness of apex angle E2 of virtual triangle E2. That is, it holds the following relation: the left scanning range 20°=apex angle E2×2=10°×2=20°.

Figure 11:
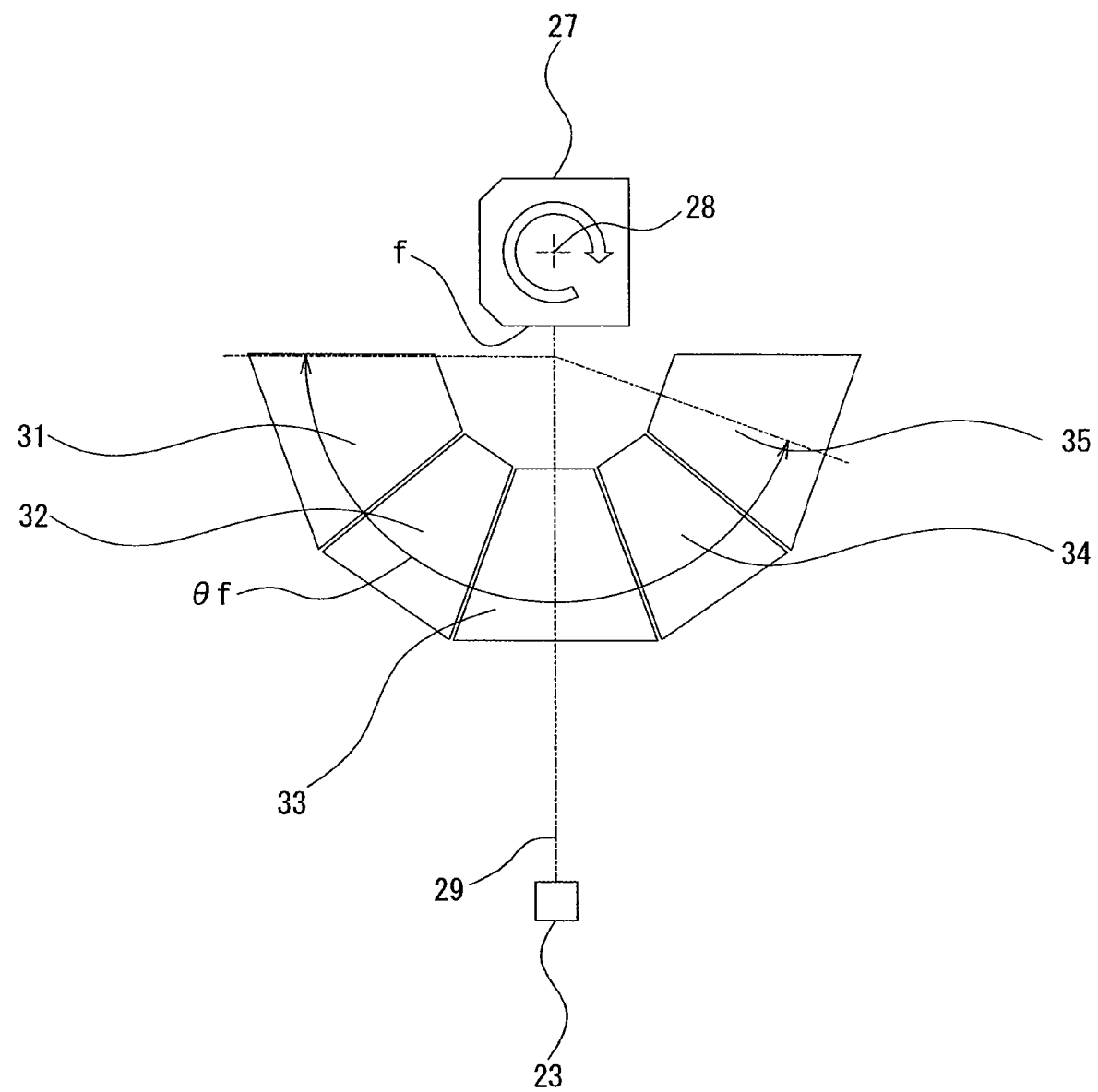
FIG. 11 is a diagram for illustrating a scanning range formed by a reflective surface f of the polygon mirror.

FIG. 11 shows a scanning range formed associated with the movement of the reflective surface f. θf represents that scanning range, which has an angle ranges between −90° and +70°, i.e. of 160°, in respect to optical axis 29 over fixed reflecting mirrors 31-35, as shown in Table of FIG. 14. This scanning range θf corresponds to the largeness of apex angle F of virtual triangle F. That is, it holds the following relation: the scanning range θf=apex angle F×2=80°×2=160°. Also, the angle range between 0° and +70° on the right to optical axis 29 corresponds to the largeness of apex angle F1 of virtual triangle F1. That is, it holds the following relation: the scanning range 70° on the right=apex angle F1×2=35°×2=70°. Similarly, the angle range between 0° and −90° on the left relative to optical axis 29 corresponds to the largeness of apex angle F2 of virtual triangle F2. That is, it holds the following relation: the left scanning range 90°=apex angle F2×2=45°×2=90°.

Figure 12A:
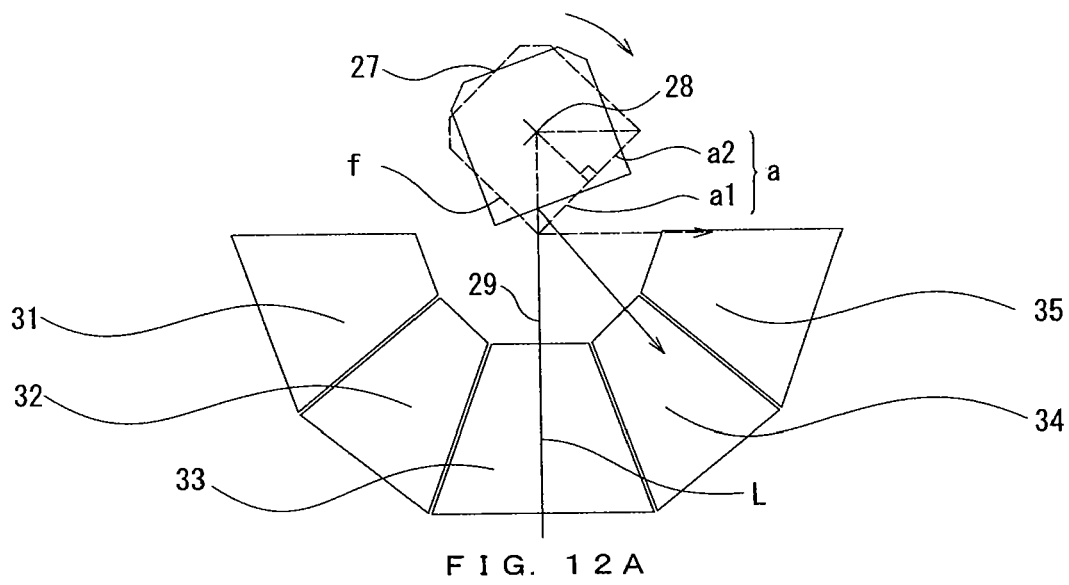
FIG. 12 is a diagram for illustrating how reflective surface a casts and swings a reflected laser beam L.
Figure 12B:
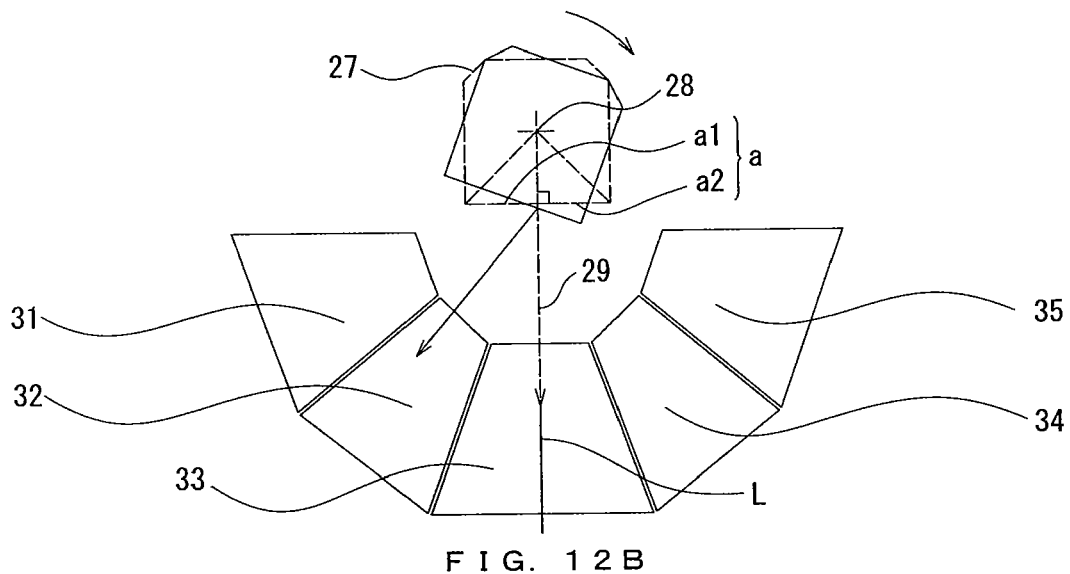
Figure 12C:
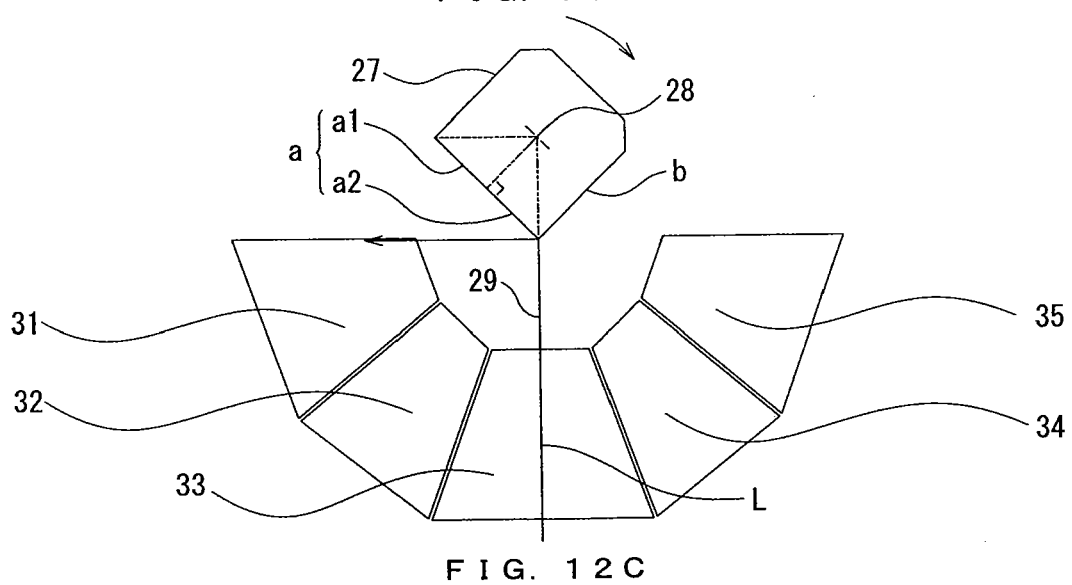

Of these scanning ranges θa-θf, θa, θc, θd, and θe have the same angle ranges on both sides in respect to optical axis 29. Scanning ranges θb and θf have different angle ranges on the two sides relative to optical axis 29. The differences depend on whether the above virtual triangles A~F are isosceles triangles or inequilateral triangles. That is, reflective surfaces a, c, d, e that constitute the bases of isosceles triangles A, C, D, E, respectively, have symmetrical scanning range in respect to optical axis 29, while reflective surfaces b, f that constitute the bases of isosceles triangles B, F, respectively, have asymmetrical scanning range in respect to optical axis 29. FIG. 12 (FIGS. 12A, 12B, and 12C) and FIG. 13 (FIGS. 13A, 13B, and 13C) illustrate operations in which reflective surfaces a, c, d, e forming isosceles triangles cast laser beam L in their movements, and reflective surfaces b, f forming inequilateral triangles cast laser beam L in their movements, respectively.

First, referring to FIGS. 12A, 12B, and 12C, the operation of laser-beam-casting by the reflective surfaces that belong to the group of an isosceles triangle will be described.

FIGS. 12A, 12B, and 12C illustrate the beam-casting operation by reflective surface a representing the above reflective surfaces a, c, d, e of the group of an isosceles triangle. Referring to FIG. 12A, Polygon mirror 27 depicted in dotted line indicates a state immediately after beam-casting action by reflective surface a has commenced following completion of casting of laser beam L by the adjacent reflective surface f. First, reflective surface a1 of triangle A1 having apex angle A1 (=45°) reflects laser beam L. The laser beam L is converted to scanning light, which proceeds in the direction of the dotted arrow line (the direction of scanning range +90°) where fixed reflecting mirror 35 is disposed. Thereafter, polygon mirror 27 continues the clockwise rotation in FIG. 12A and reach the position of polygon mirror 27 depicted in solid line. In this state, reflective surface a1 emits the scanning light to the solid-line direction where fixed reflecting mirror 34 is disposed.

Referring to FIG. 12B, the polygon mirror 27 depicted in dot line indicates a state in which laser beam L is reflected at the boundary between reflective surface a1 and reflective surface a2 while the mirror continuing the rotation from the state in FIG. 12 A. In this state, reflective surface a emits the scanning light in the dotted arrow direction (scanning range ±0°) where fixed reflecting mirror 33 in the center of fixed reflecting mirrors 31-35 is positioned. In this manner, reflective surface a1 casts laser beam L in a range between 0° and +90° (angle A1×2=90°) along with the rotation of polygon mirror 27.

With the continuing further rotation of polygon mirror 27, reflective surface a2 of triangle A2 commences casting of laser beam L following the above-described state. At the position of polygon mirror 27 depicted in solid line, reflective surface a2 emits the scanning light in the solid-line arrow direction where fixed reflecting mirror 32 is positioned.

Polygon mirror 27 in FIG. 12C indicates a state immediately before the beam-casting by reflective surface a2 is completed. In this state, reflective surface a2 emits the scanning light in the direction (direction of scanning range −90) where fixed reflecting mirror 31 is positioned. In this manner, reflective surface a2 emits the scanning light along with the rotation of polygon mirror 27 in a range between 0° and +90° (angle A2×2=90°). When the rotation of polygon mirror 27 further continues, the beam-casting by reflective surface a is completed and subsequent beam-casting by reflective surface b commences.

By the above-described operations, because reflective surfaces a, c, d, e that belong to the group of an isosceles triangle have relations of apex angle A1=apex angle A2, apex angle C1=apex angle C2, apex angle D1=apex angle D2, apex angle E1=apex angle E2, the reflective surfaces cast laser beam L over the symmetrical ranges in respect to optical axis 29.

Now, beam-casting operations by reflective surfaces that belong to the group of an inequilateral triangle will be described.

Figure 13A:
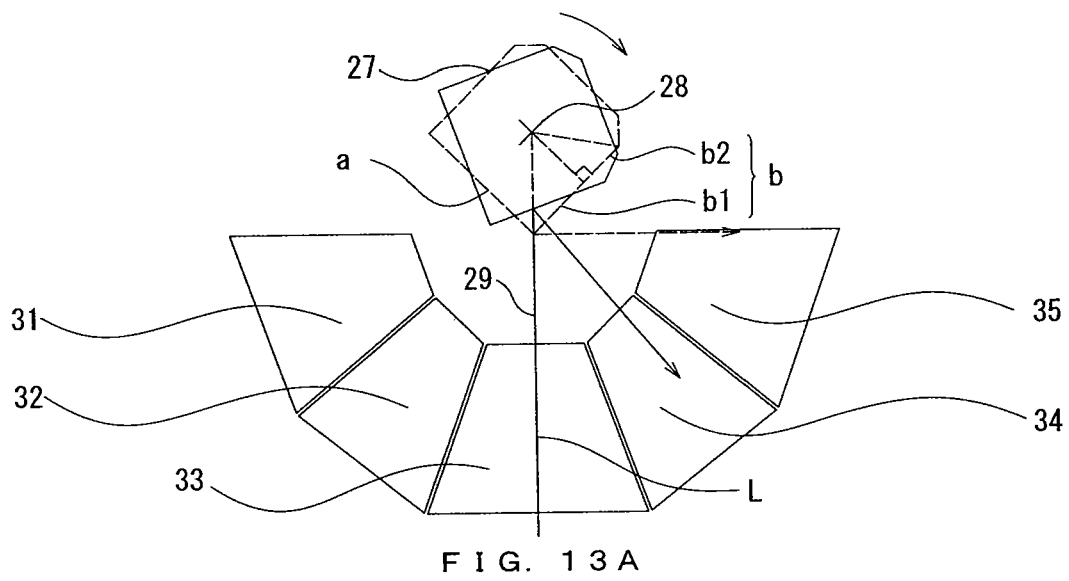
FIG. 13 is a diagram for illustrating how reflective surface b casts and swings a reflected laser beam L from the surface.

FIG. 13 shows a state of the beam-casting operation by reflective surface b representing the reflective surfaces b, f of the group of an inequilateral triangle. Polygon mirror 27 depicted in dotted line in FIG. 13A indicates a state immediately after beam-casting action by reflective surface b has commenced following completion of casting of laser beam L by the adjacent reflective surface a. First, reflective surface b1 of triangle B1 having apex angle B1 (=45°) reflects laser beam L. The laser beam L is converted to scanning light, which proceeds in the direction of the dotted arrow line (the direction of scanning range +90°) where fixed reflecting mirror 35 is positioned. Thereafter, polygon mirror 27 continues the clockwise rotation in FIG. 13A and reach the position of polygon mirror 27 depicted in solid line. In this state, reflective surface b1 emits the scanning light to the solid-line direction where fixed reflecting mirror 34 is positioned.

Figure 13B:
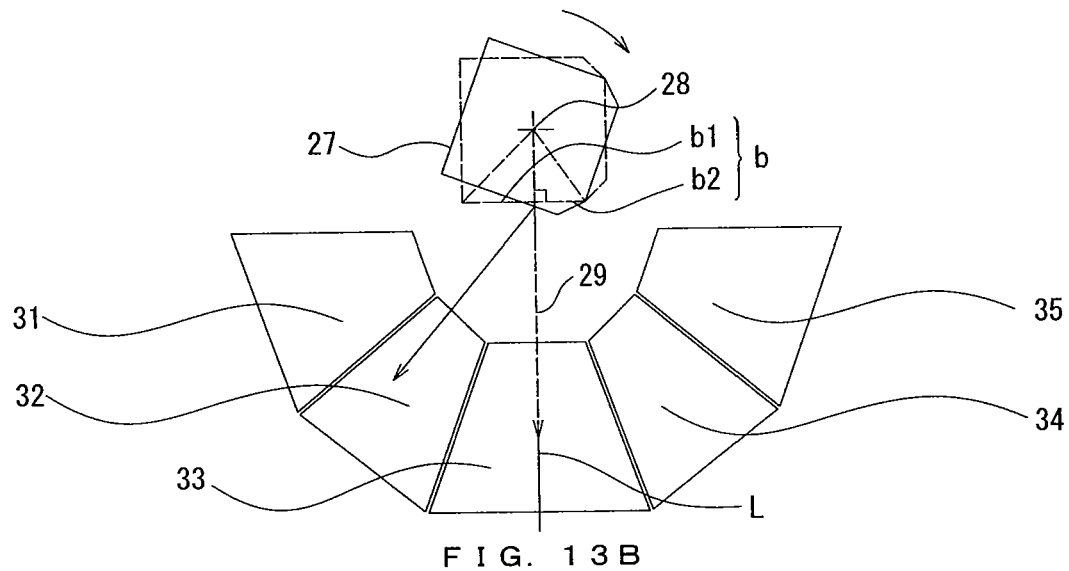

Referring now to FIG. 13B, the polygon mirror 27 depicted in dot line shows a state in which laser beam L is reflected at the boundary between reflective surface b1 and reflective surface b2 while the mirror continuing the rotation from the state in FIG. 13B. In this state, reflective surface b emits the scanning light in the dotted arrow direction (scanning range ±0°) where fixed reflecting mirror 33 in the center of fixed reflecting mirrors 31~35 is positioned. In this manner, reflective surface b1 casts laser beam L in a range between 0° and +90° (angle B1×2=90°) along with the rotation of polygon mirror 27.

With the continuing rotation of polygon mirror 27, reflective surface b2 of triangle B2 commences beam-casting of laser beam L. At the position of polygon mirror 27 depicted in solid line, reflective surface b2 emits the scanning light in the solid-line arrow direction where fixed reflecting mirror 32 is positioned.

Figure 13C:
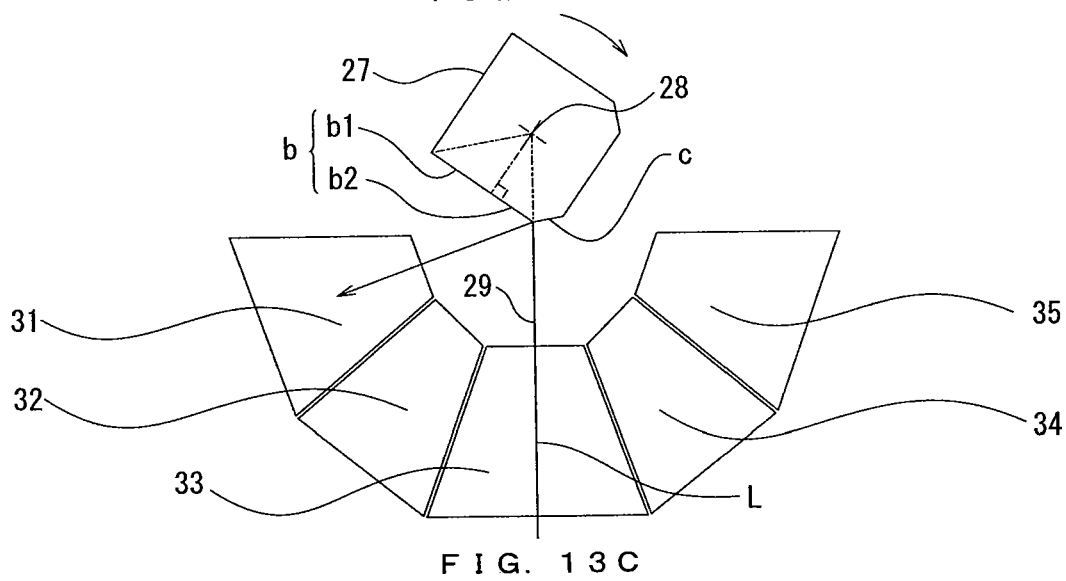

Polygon mirror 27 in FIG. 13C shows a state immediately before the beam-casting by reflective surface b2 is completed. In this state, reflective surface b2 emits the scanning light in the direction (direction of scanning range −70°) where fixed reflecting mirror 31 is positioned. In this manner, reflective surface b2 emits the scanning light along with the rotation of polygon mirror 27 in a range between 0° and −70° (angle B2×2=70°). When the rotation of polygon mirror 27 further continues, the beam-casting by reflective surface b is completed and beam-casting by reflective surface c commences.

By the above-described operations, because reflective surfaces b, f that belong to the group of an inequilateral triangle have relations of apex angle B1≠apex angle B2, apex angle F1≠apex angle F2, the reflective surfaces cast laser beam L over the asymmetrical ranges in respect to optical axis 29.

In general, the scanning ranges of the respective reflective surfaces are indirectly affected by the number of reflective surfaces of the polygon mirror. That is, because the fewer the number of reflective surfaces is, an apex angle of a virtual triangle becomes greater and corresponding scanning ranges becomes larger; on the contrary, the more the number of reflective surfaces is, an apex angle of a virtual triangle becomes smaller and corresponding scanning ranges becomes narrower.

Now, scanning patterns that are depicted on an object such as a commodity by the scanning light produced by polygon mirror 27 will be described in conjunction with FIGS. 15~21.

FIG. 16 collectively illustrates the trajectories depicted on fixed reflecting mirrors 31~35 by the scanning light over the ranges θa~θf, which have been described in reference to FIGS. 15~21.

Herein, scanning light produced by reflective surfaces c, e casting laser beam L in the scanning range of 40° will be referred to as "first scanning light," while scanning light produced by reflective surfaces a, b, d, f casting laser beam L in the scanning range over 40° will be referred to as "second scanning light." Referring to FIG. 16, fixed reflecting mirror 33 is defined as a "first fixed reflecting mirror" that reflects both the first scanning light and second scanning light, while fixed reflecting mirrors 31, 32, 34, 35 are defined as a "second fixed reflecting mirror" that reflects only the second scanning light.

FIG. 15 shows reflection light Ha though reflection light Hf that are reflected towards read window 22 by fixed reflecting mirror 33 that are commonly used. Scanning light Ha among these reflection light Ha though reflection light Hf indicates one that is produced such that scanning light cast by reflective surface a is reflected towards read window 22 depicting trajectory La on fixed reflecting mirror 33. Similarly, reflection light Hb through reflection light Hf are ones produced such that the respective scanning light components cast by reflective surfaces b-f are reflected towards read window 22 depicting trajectories Lb-Lf. Of reflection light Ha through reflection light Hf, scanning light Hc and scanning light He correspond to the first scanning light, while scanning light components Ha, Hb, Hd, Hf correspond to portions of the respective light components of the second light group. In this embodiment, no reference numerals are attached to light components of the second scanning light group other than ones indicated with Ha, Hb, Hd, Hf.

Figure 18A:
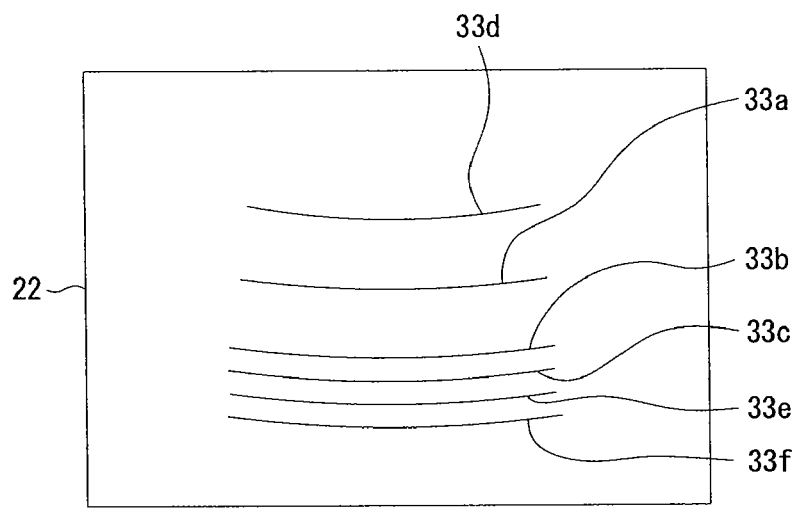
FIG. 18 is a diagram for illustrating the scanning patterns of FIG. 17 by a type.
Figure 18B:
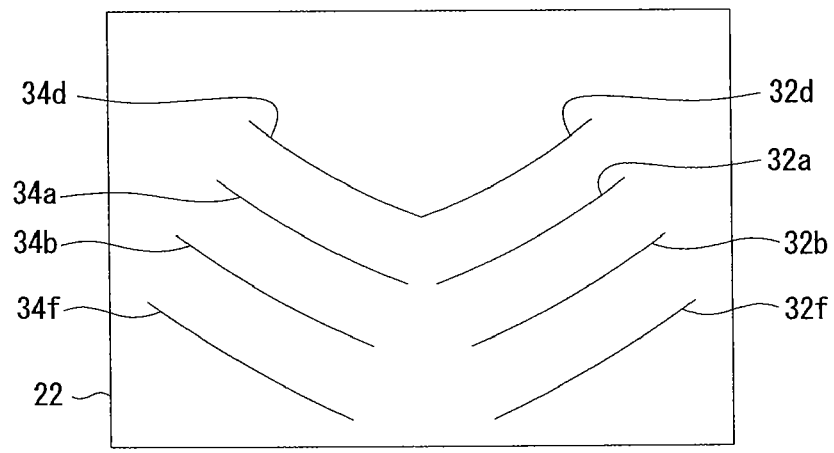
Figure 18C:
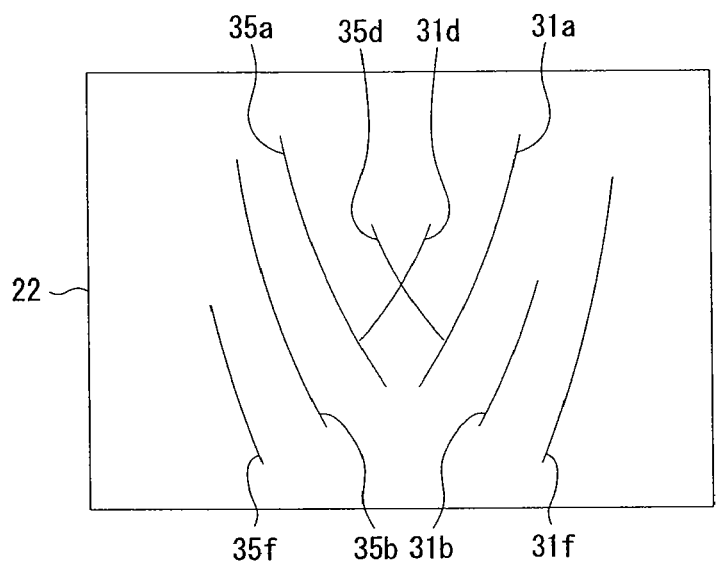
Figure 19A:
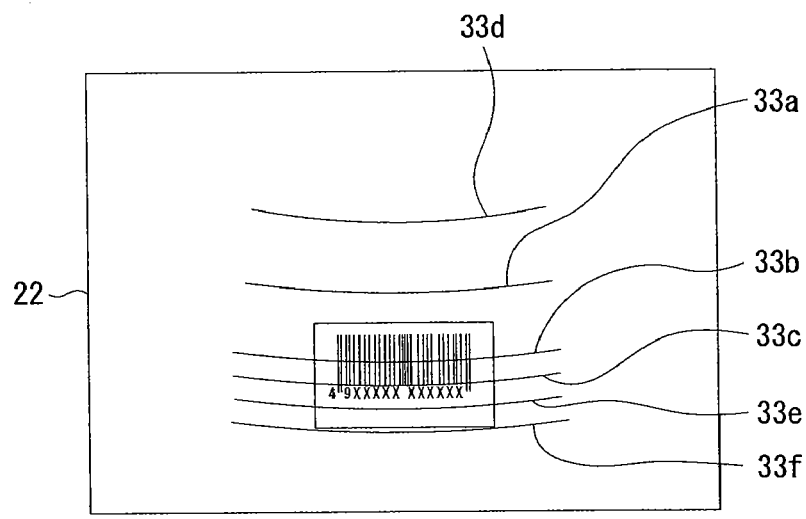
FIG. 19 is a diagram showing various positions of barcodes at which the respective scanning patterns can best read them.
Figure 19B:
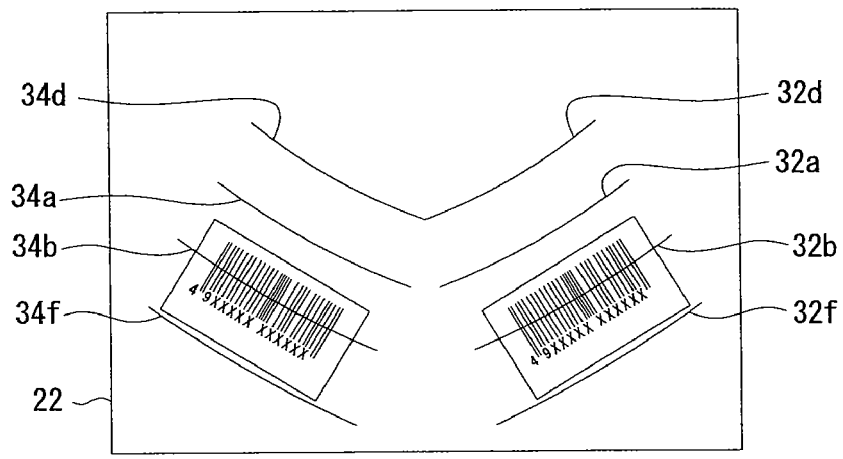
Figure 19C:
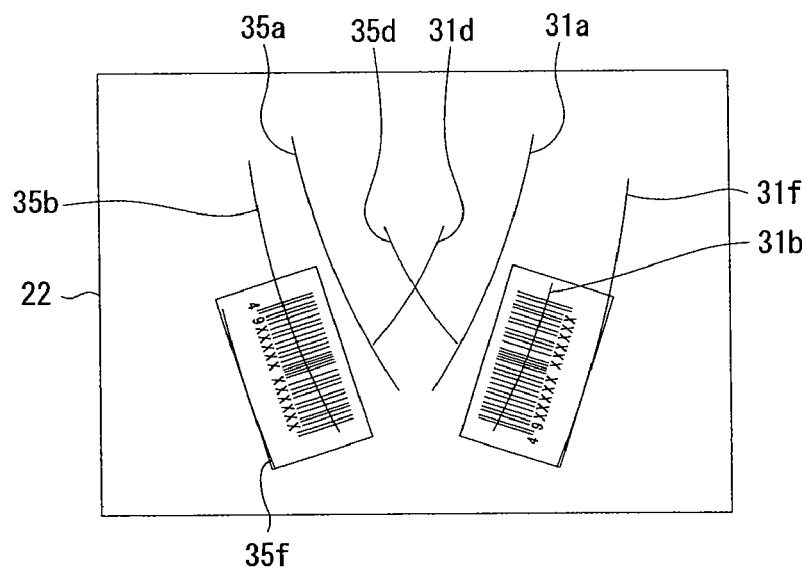

FIG. 17 shows scanning patterns formed on read window 22 by these scanning light components Ha~Hf and those reflected from other fixed reflecting mirrors 31-35 towards read window 22. The scanning patterns in FIG. 17 are comprised of three types of scanning patterns, which are separately depicted in FIGS. 18A, 18B, and 18C. FIG. 18A shows a horizontal type scanning pattern comprised of horizontal scanning lines 33*a*-33*f*; FIG. 18B shows a wedge-type scanning pattern comprised of horizontal scanning lines 32*a*, 32*b*, 32*d*, 32*f*, and 34*a*, 34*b*, 34*d*, 34*f* symmetrically inclined (being split into two sides); FIG. 18C shows a vertical type scanning pattern comprised of scanning lines 31*a*, 31*b*, 31*d*, 31*f*, and 35*a*, 35*b*, 35*d*, 35*f* symmetrically further inclined (scanning lines symmetrical but having different lengths); Read window 22 in FIGS. 17 and 18 shows a view from the rear in FIG. 15A (from the right in FIG. 15B). The above horizontal scanning pattern corresponds to a first scanning pattern, while the above wedge-type scanning pattern corresponds to a second scanning pattern.

Now, the relationship between these three types of scanning patterns and fixed reflecting mirrors 31-35 will be described.

These three patterns correlates to the positions of fixed reflecting mirrors 31-35. That is, the horizontal scanning pattern depicted in FIG. 18A is produced by the scanning light components Ha~Hf reflected from the common fixed reflecting mirror 33 in FIGS. 15 and 16. The right half portion of the wedge-type scanning pattern including scanning lines 32*a*, 32*b*, 32*d*, 32*f* in FIG. 18B is produced by reflection of the second scanning light, which is cast by reflective surfaces a, b, d, f, from fixed reflecting mirror 32 (refer to FIG. 16), while the left half portion including scanning lines 34*a*, 34*b*, 34*d*, 34*f* is produced by reflection of the second scanning light, which is cast by reflective surfaces a, b, d, f, from fixed reflecting mirror 34 (also refer to FIG. 16). The right half portion of the vertical scanning pattern depicted in FIG. 18C including scanning lines 31*a*, 31*b*, 31*d*, 31*f* is produced by reflection of the second scanning light, which is cast by reflective surfaces a, b, d, f, from fixed reflecting mirror 31 (refer to FIG. 16). The left half portion thereof including scanning lines 35*a*, 35*b*, 35*d*, 35*f* is produced by reflection of the second scanning light, which is cast by reflective surfaces a, b, d, f, from fixed reflecting mirror 35 (refer also to FIG. 16). The gradients of the above three patterns are set so that scanning is enabled in any of the positions wherein directions of bars arrangement that constitutes a barcode is oriented horizontally as shown in 19(*a*), vertically as in FIG. 19C, or in a manner in between the two. In view of reading a barcode positioned any direction, it is ideal to form the patterns so that gradients between the patterns of the horizontal type, right and left portions of the wedge-type, and right and left portions of the vertical-type become 36 degrees (that is, horizontal direction 180° divided by five fixed reflecting mirrors equals to 36°). By forming such three type of scanning patterns each scanning line having a gradient different from another, a barcode can be appropriately scanned regardless of the orientation of barcode arrangement on commodities.

In the horizontal scanning pattern in FIG. 18A, four of the second scanning lines 33*a*, 33*b*, 33*d*, 33*f*, which are produced by the second scanning light components Ha, Hb, Hd, Hf, are arranged in parallel to each other at even intervals. The first scanning lines 33*c*, 33*e*, which are produced by the first scanning light components Hc, He, are arranged in parallel between the above second scanning lines 33*b* and 33*f* at even intervals therebetween. Herein, the first scanning lines 33*c*, 33*e* produced by the first scanning light components Hc, He emerge only in the horizontal type scanning pattern.

In the wedge-type scanning pattern in FIG. 18B, the third scanning lines 32*a*, 32*b*, 32*d*, 32*f*, and 34*a*, 34*b*, 34*d*, 34*f*, which are produced by the second scanning light components other than Ha, Hb, Hd, Hf, are arranged with four on the right and left side at even intervals each line in parallel on each side.

In the vertical-type scanning pattern in FIG. 18C, the third scanning lines 31*a*, 31*b*, 31*d*, 31*f*, and 35*a*, 35*b*, 35*d*, 35*f*, which are formed by the second scanning light components other than Ha, Hb, Hd, Hf, are arranged at even intervals in parallel on each side.

Figure 21:
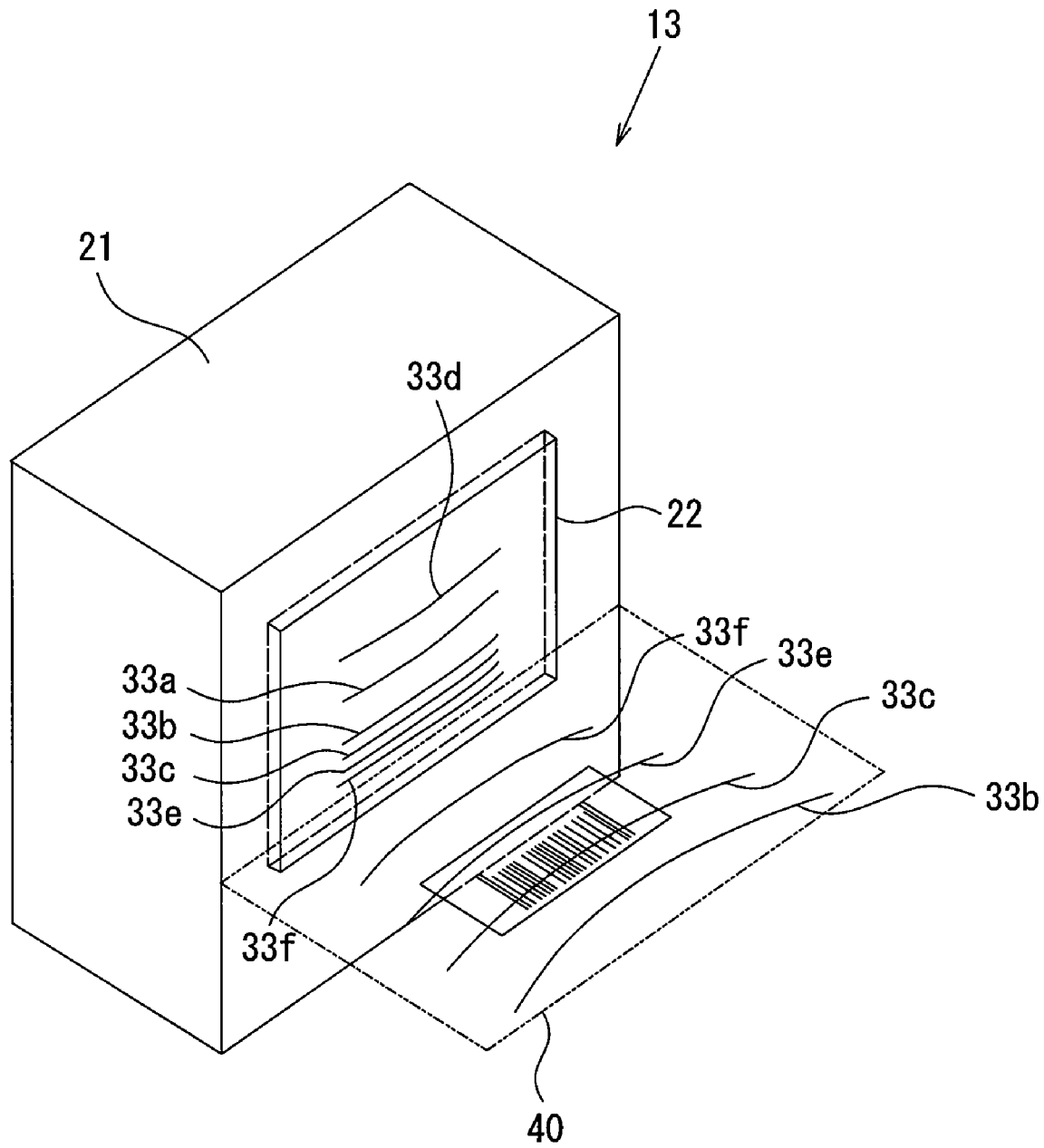
FIG. 21 shows a situation wherein tray-packed goods is carried in and positioned on a virtual plane orthogonal to the read window.

FIG. 20 illustrates the relationship between scanning light components Ha~Hf and the horizontal-type scanning pattern. Referring to FIG. 20, first scanning light components Hc and He, which form the first scanning lines 33*c*, 33*e*, pass through read window 22 being sandwiched between second scanning light components Hb and Hf, which form the second scanning lines 33*b*, 33*f*. Herein, the first scanning light components Hc and He proceed at a lower angle from the horizontal direction in the same manner as the second scanning light does when passing through read window 22. As a result, as illustrated in FIG. 21, the first scanning lines 33*c*, 33*e* are formed so as to intervene between two of the second scanning lines 33*b*, 33*f* on the virtual surface 40 orthogonal to read window 22 where a commodity in a tray are carried in. Thus, the reading accuracy of a barcode improves.

Since high density scanning patterns are thus formed by providing equally-spaced mutually parallel multiple second scanning lines and further interpolating the first scanning lines, which are produced by the first scanning light passing through read window 22 at a lower angle, between the above second scanning lines in parallel, the reading of a barcode affixed on a surface of commodities, such as one packed in a tray, can be assuredly achieved without the need of leaning the commodities.

Figure 22A:
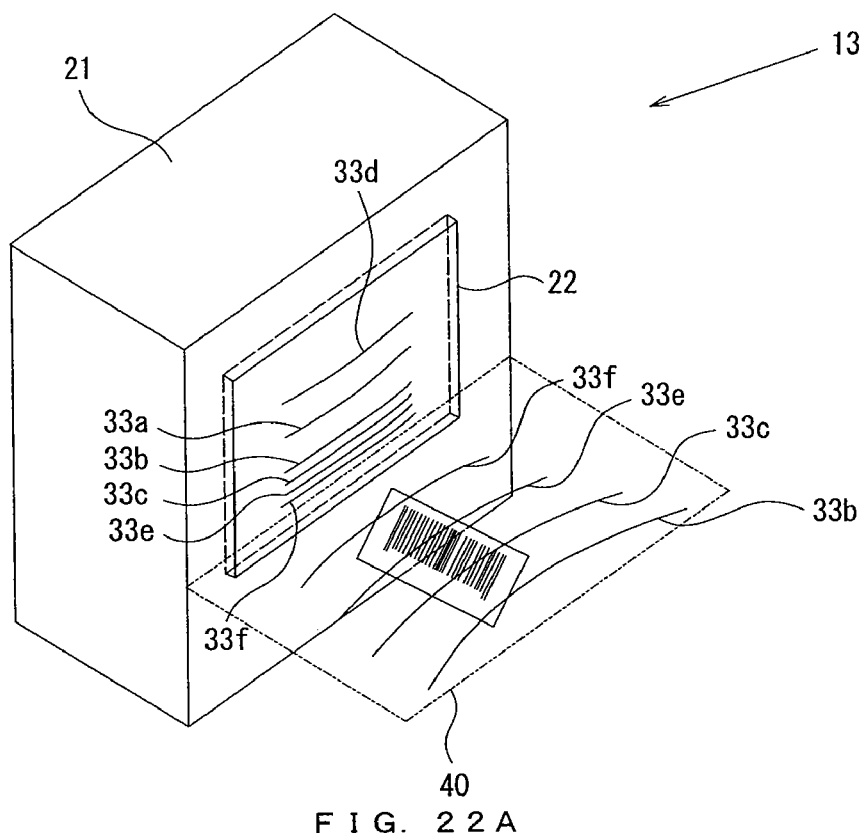
FIG. 22 a situation wherein tray-packed goods is carried in and positioned on a virtual plane orthogonal to the read window, but at an angle different from the position posed in FIG. 21.
Figure 22B:
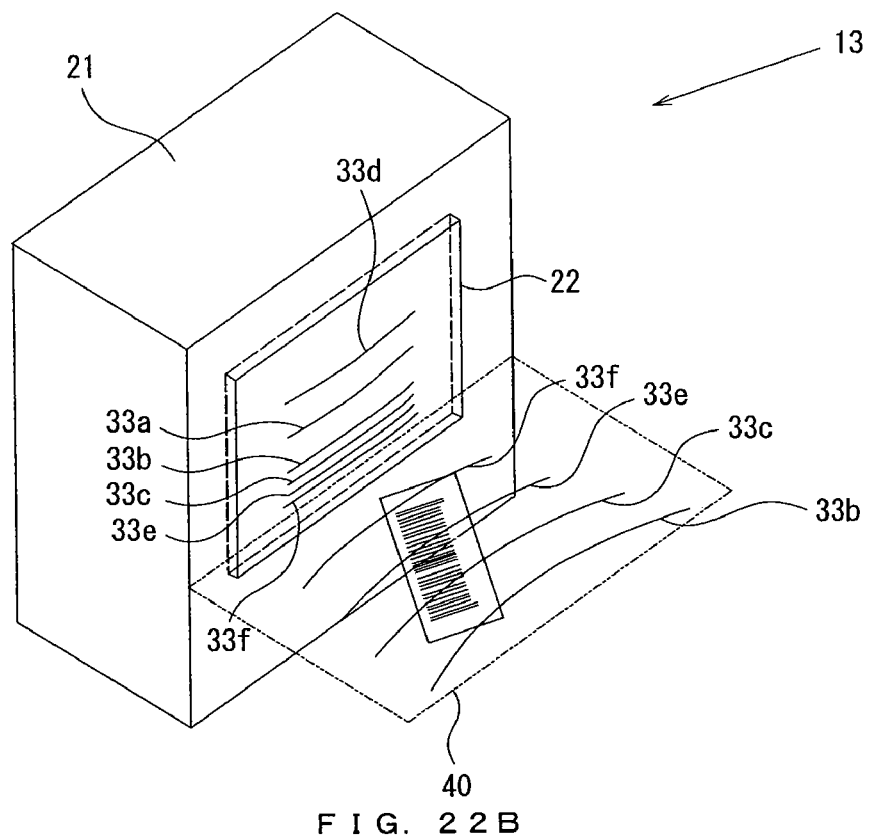

In general, when an operator performs barcode reading operation on a commodity, for example, after picking a commodity from a shopping basket 14 located on the right of checkout counter 4, he or she often once stops movement of the commodity held with his/her hand in right front of read window 22 during the movement from the right to left through read window 22 to assure the reading of the barcode. In some cases, after he/she confirms that the reading has been successfully performed by taking a barcode label on a commodity close to read window 22 and hearing a reading completion sound, he/she puts the commodity into a shopping basket 15 on the left side. In such a case, if a commodity packed in a tray atop which a barcode label is affixed is handled, as shown in FIGS. 22A and 22B, the barcode is seldom read by inclining the commodity to read window 22. Instead, the reading is often made, as shown in FIG. 21, in a position wherein the commodity is positioned so that the orientation extended from multiple bars that compose a barcode become practically orthogonal to the plane of read window 22. Accordingly, on barcode reading in a manner as shown in FIG. 21 it is effective to form a horizontal scanning pattern comprised of scanning lines intersecting those barcode bars on the virtual surface 40 and to further arrange the scanning lines closely to each other. Therefore, by forming the horizontal scanning pattern in which the first scanning line runs towards the front of read window 22, the reading accuracy from barcodes affixed atop commodities as in those packed in a tray can be further improved.

Now, the relationship between these three types of scanning patterns and polygon mirror 27 will be described.

To form the first scanning lines within the horizontal scanning pattern, polygon mirror 27 in the present embodiment is provided with two of the first reflective surface, c, e having a small apex and a narrow scanning range and the second reflective surfaces a, b, d, f having a larger apex angle and larger scanning range. Thus, while a wide scanning range of 140° to 180° can be acquired by the second scanning light, the first scanning lines can be formed in a required minimum scanning range for reading a barcode label on top. As a result, comparing to the case of providing, for example, scanning lines each having even scanning range of 120° by simply dividing the circumference of the polygon mirror into six surfaces having even apex angles (360°/6=60°), more effective scanning light can be attained. That is, reading accuracy from barcode labels on the top of commodities can be improved without sacrificing the total scanning range (readable range).

In addition, among the three types of the scanning patterns, the vertical scanning pattern shown in FIG. 18C is provided with two kinds of scanning lines: scanning lines 31*a*, 31*f*, 35*a*, 35*b* each having a longer line and scanning lines 31*b*, 31*d*, 35*d*, 35*f* each having a shorter line. These scanning lines correspond to the trajectories La, Lb, Ld, Lf on fixed reflecting mirrors 31 and 35 depicted in FIG. 16. This is because the scanning light components that are produced by fixed reflective surfaces b, d, f, having an apex angle smaller than 90° and a scanning range narrower than 180° are emitted towards fixed reflecting mirrors 31, 35 that are disposed at the ends of the mirror assembly. In the present embodiment, the oblique angle of symmetrical reflective surface d having a symmetrical scanning range in respect to optical axis 29 among four reflective surfaces a, b, d, f whose scanning ranges cover fixed reflecting mirrors 3 1, 35 disposed at the ends is set to be larger than those of asymmetrical reflective surfaces b, f having asymmetrical scanning ranges in respect to optical axis 29. As a result, the group of the third scanning lines 31$d$, 35$d$ having the same lengths are formed so as to be positioned within the group of the third scanning lines 31$f$, 35$f$, 31$b$, 35$b$ having different lengths. Accordingly, in the center of read window 22 where more significant reading is taken place in the scanning operation, the scanning pattern becomes laterally symmetry. Therefore, even in the case that the positions of bar-code scanning device 3 and checkout counter 4 are altered so that the flow of commodities passing the front of read window 22 (from the right to the left, from the left to the right) is reversed (from the right to the left, from the left to the right), the difference of reading accuracies between the two flows can be reduced.

As described above, according to the present invention, barcode scanning device 3 forms the scanning pattern comprised of the second scanning lines 33$a$. 33$b$, 33$d$, 33$f$, each line being parallel with another line, produced by the second scanning light reflected from the common fixed reflecting mirror 33, and the scanning pattern comprised of the first scanning lines 33$c$, 33$e$, which are parallel with the second scanning lines 33$a$. 33$b$, 33$d$, 33$f$, produced by the first scanning light reflected from the common fixed reflecting mirror 33. Thus, as to commodities such as ones packed in a tray atop which a barcode label is affixed, the barcode can be assuredly read without the need of inclining the commodities.

In the first embodiment above-described, the first scanning lines are arranged between two of the second scanning line. However, the first scanning lines may be arranged below the bottom line of the second scanning lines.

The terms of "parallel" and "horizontal" used in this embodiment do not indicate strict meaning of such terms. The terms encompass statuses of the line arrangement of being more or less inclined or distorted, as long as such statuses do not affect the effect of the present invention.

Second Embodiment

Figure 25:
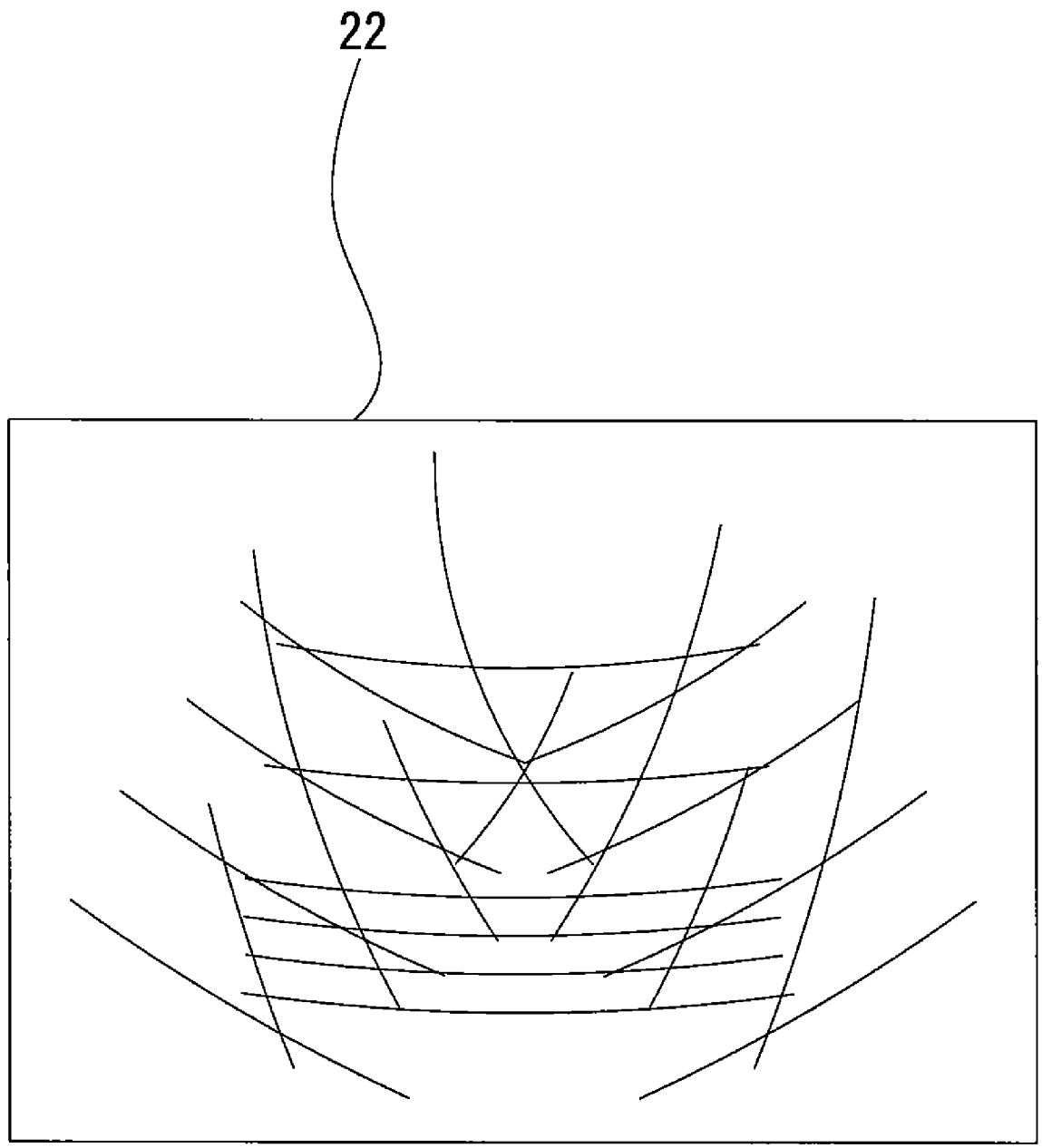
FIG. 25 shows scanning patterns transmitting through the read window.

The second embodiment according to the present invention will now be described in conjunction with FIGS. 23-25. The same reference numbers are attached to the like parts appeared in the preceding embodiment, and detailed descriptions for them will be omitted.

Figure 23:
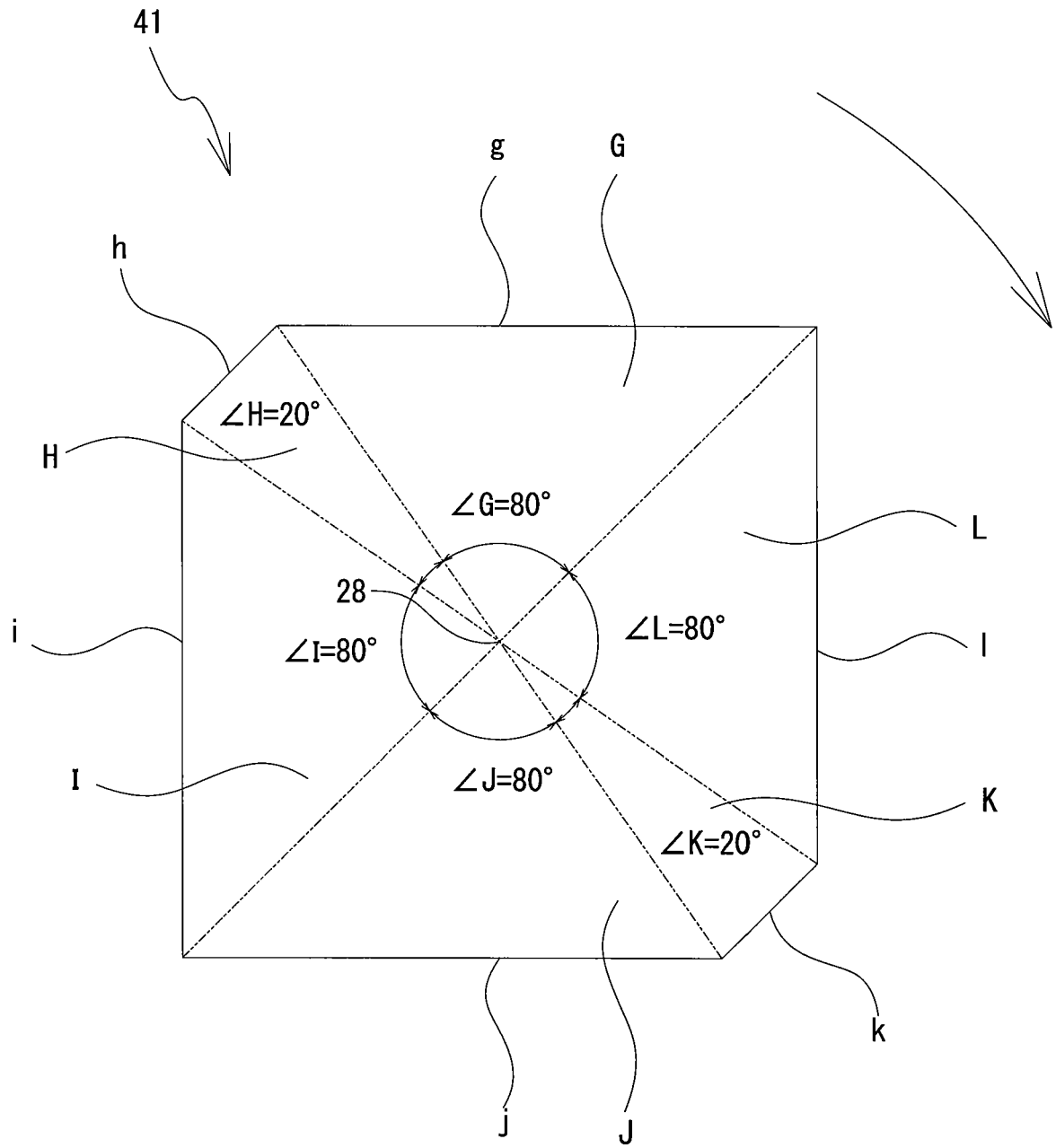
FIG. 23 is a transverse section of a polygon mirror according to a second embodiment of the present invention wherein the polygon mirror is transversely cut at a laser beam striking part.

FIG. 23 shows a virtual cross-section, forming a hexagon, of a polygon mirror 41 pertaining to the second embodiment across laser-beam striking part 30. If lines are drawn between rotation axis 68 and the respective apexes of the hexagon in this virtual cross-section, virtual triangles G-L are formed. Each of the triangles G-L is structured with reflective surfaces g-l as its corresponding base and rotation axis 28 as its apex. As to apex angles of virtual triangles G-L, angle G=angle I=angle J=angle L=80°; apex angles of virtual triangles H and K are each 20°. Virtual triangles H, K each form an isosceles triangle, while virtual triangles G, I, J, L each form an inequilateral triangle.

The difference between the preceding embodiment and the second embodiment lies in the shape of the polygon mirror.

That is, the first reflective surfaces h, k are formed so that apex angles H, K are each symmetric with respect to a rotation axis 28. Also, reflective surfaces g, i, j, l are formed so that apex angles G, J, and apex angles I, I are respectively symmetric relative to rotation axis 28.

In this way, by forming the virtual cross-section of polygon mirror 41 symmetric with respect to rotation axis 28, the center gravity of polygon mirror 41 practically coincides with rotation axis 28. By minimizing the inertia moment about rotation axis 28 and lowering of the angular momentum, the load of the (driving motor not shown) can be alleviated.

The shape of the virtual section of the polygon mirror in the second embodiment is not necessarily limited to be point-symmetry. As long as the center gravity of polygon mirror 41 practically coincides with rotation axis 28, the shape may be, for example, a shape of rotational-symmetric property of more than one rotation wherein the shape returns to its original within one rotation. The relationship between reflective surfaces g-l and corresponding apex angles G-L, and corresponding scanning ranges θg-θl is the same as in the preceding embodiment. The specific scanning ranges of θg-θl are shown in FIG. 24. The scanning patterns are also shown in FIG. 25. Within the horizontal patterns, there appear the first scanning lines, which are formed by reflective surfaces h, k as the first reflective surface, interposing between two or more of the second scanning lines formed by reflective surfaces g, i, j, l as the second reflective surface. The first scanning light, similarly as the second scanning light, is transmitted through read window 22 inclined at a lower angle. Therefore, the same effect as in the preceding first embodiment can be achieved.

Third Embodiment

The third embodiment in the present invention will now be described in conjunction with FIGS. 26 and 27. The same reference numbers are attached to the like parts appeared in the preceding embodiments, and detailed descriptions for them will be omitted.

The difference from the first embodiment lies in its structural arrangement within housing 21. That is, in the third embodiment, the respective positions of light source 23, polygon mirror 27, fixed reflecting mirrors 31-35, mirror 26 having an aperture, condenser 25, and light-receptor section 24 are vertically reversed to those in the first embodiment. The structures of these components are not shown.

Figure 26:
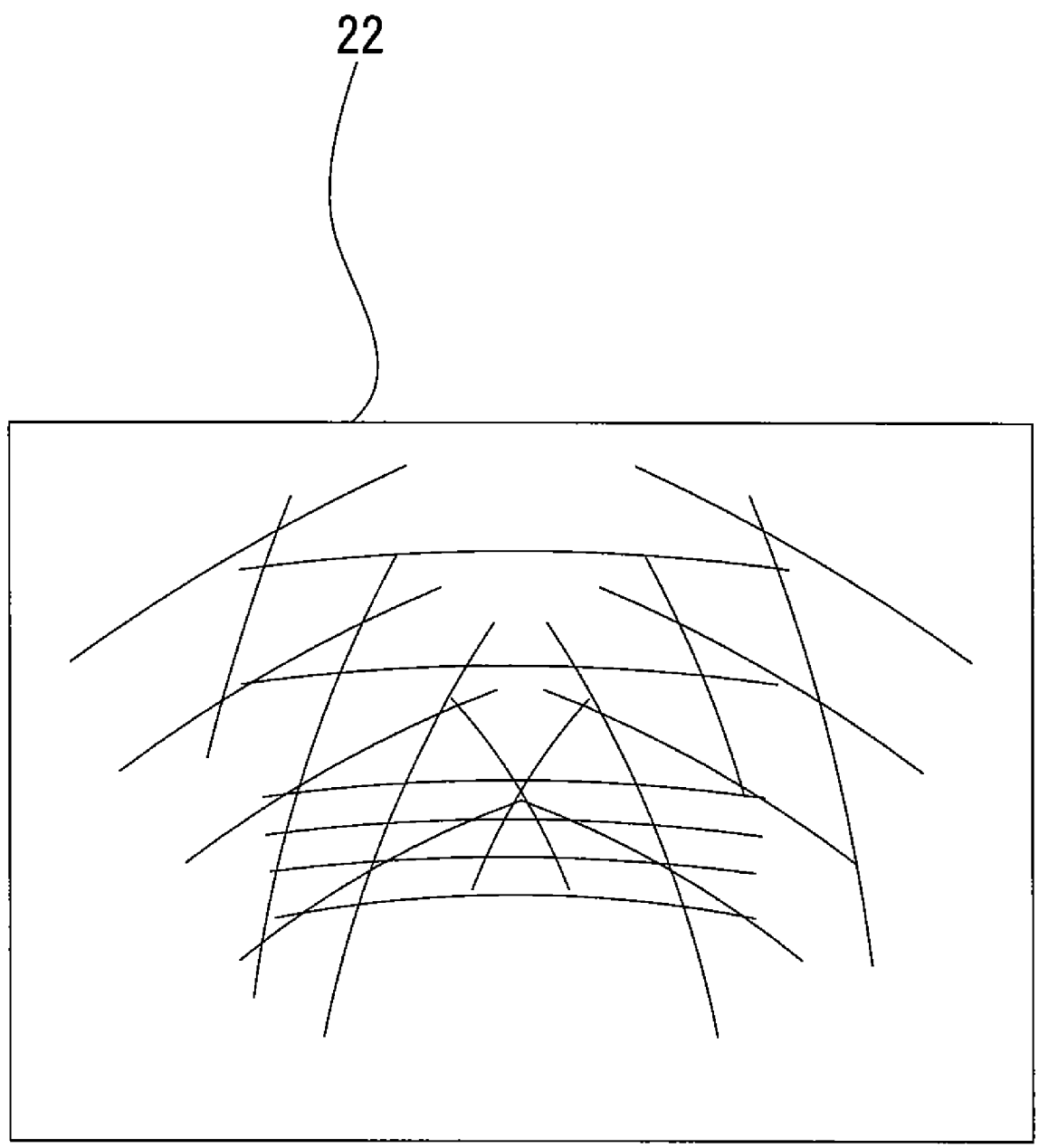
FIG. 26 shows scanning patterns, according to a third embodiment of the present invention, depicted when the scanning light emitted from barcode scanning device passes through the read window.

Scanning patterns formed by a barcode scanning device according to the third embodiment (not shown) are shown in FIG. 26. Also shown in FIG. 27 is the horizontal scanning pattern among the scanning patterns shown in FIG. 26. In this third embodiment, as in the first embodiment, there appear the first scanning lines, which are formed by reflective surfaces c, e as the first reflective surface, interposing between two or more of the second scanning lines formed by reflective surfaces a, b, d, f as the second reflective surface. The first scanning light, similarly as the second scanning light, is transmitted through read window 22 inclined at a lower angle from a horizontal plane. Therefore, the same effect as in the preceding first embodiment can be achieved.

Figure 28:
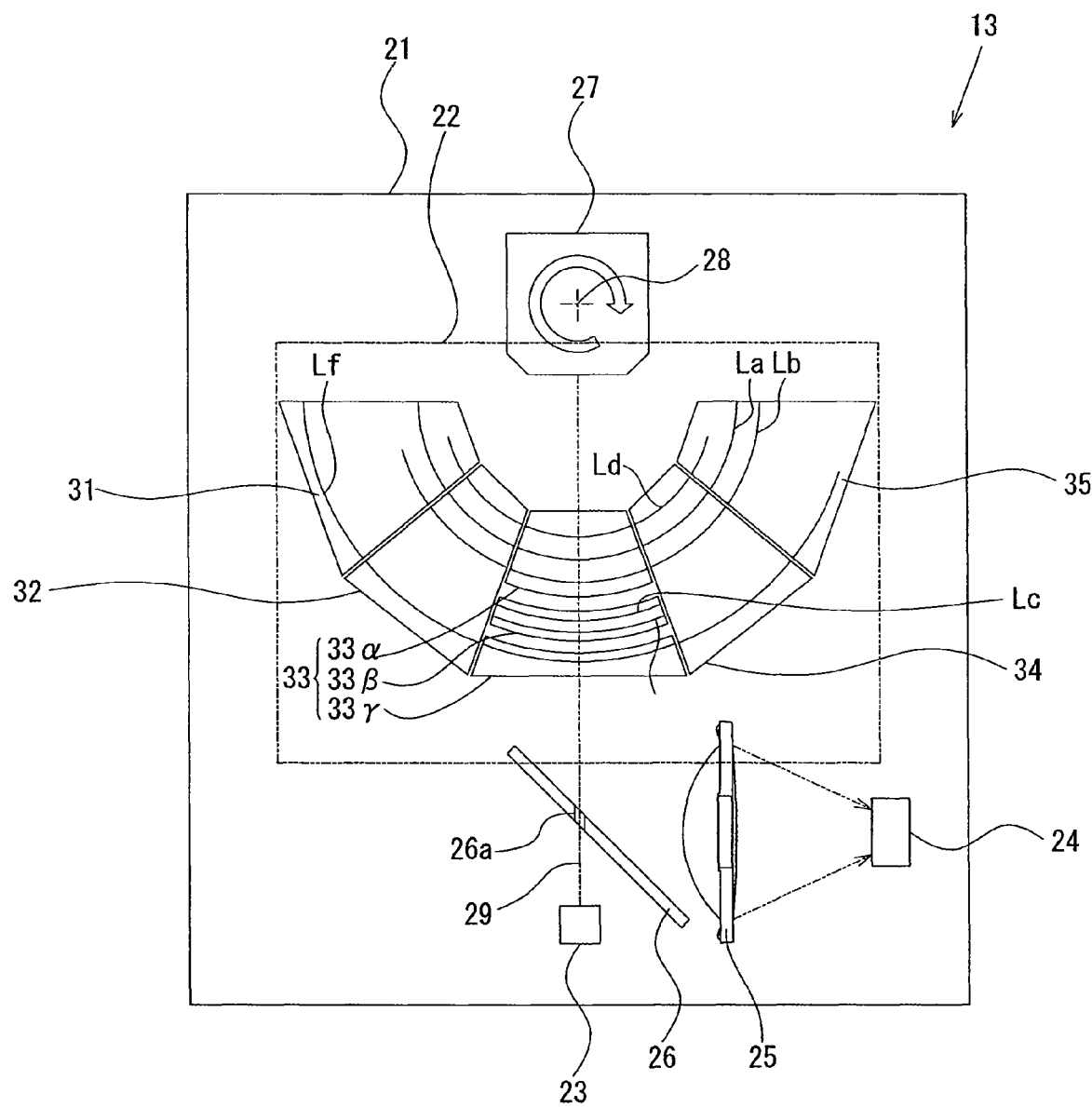
FIG. 28 is a diagram for illustrating the technical scope of the present invention.

According to the above-described embodiment, the first fixed reflecting mirror substantially functions as a reflective surface that reflects the first scanning light and second scanning light in the same directions of the groups of former scanning patterns (horizontal pattern, either right or left portion of the wedge-type pattern, either right or left portion of the vertical pattern). Accordingly, even if fixed reflecting mirror 33 is divided into three fixed reflecting mirrors 33α, 33β, 33γ so that the first scanning light is reflected by fixed reflecting mirror 33β and the second scanning light is reflected by fixed reflecting mirrors 33α, 33γ, as illustrated in FIG. 28, since these first scanning light and second scanning light form the same structure as the horizontal pattern described earlier, such a scheme is regarded to be covered in the technical scope of the present invention.

In the first embodiment, the respective scanning angle ranges by reflective surfaces c, e as the first reflective surface are set to same values, i.e. θc=θe=20°. However, the subject invention is not limited to this structure. As long as it performs the same operation and effect as the first scanning line, the two scanning angle ranges may be set differently from one another (θc≠θe).

Furthermore, in the first embodiment, there have been provided two reflective surfaces c, e as the first reflective surface. However, the number of the reflective surfaces can be singular (reflective surface c only, or reflective surface e only), being suitably adapted according to a practical application or purpose of the invention.

Still furthermore, bar-code scanning device 3 in any of the above-described embodiments is provided with read window 22 orthogonal to the upper surface of checkout counter 4. However, as long as it achieves the same effect of the present invention, the structure may be such that, for example, housing 5 is vertically bent in its middle part and bar-code scanner unit 13 is installed within the bent part of the housing. That is, housing 5 is installed such that the read window is somewhat inclined from a vertical plane on checkout counter 4.

The present invention has been described with respect to specific embodiments. However, other embodiments based on the principles of the present invention should be obvious to those of ordinary skill in the art. Such embodiments are intended to be covered by the claims.

What is claimed is:

1. A barcode scanning device which scans an encoded information such as a barcode in an information reading area, comprising:
   a housing having a read window;
   a light source for emitting a light beam, the light source being accommodated within the housing;
   a polygon mirror rotatably accommodated within the housing, wherein the polygon mirror comprises a first reflective surface and more than one second reflective surfaces, the first reflective surface reflecting the light beam in an angle range of θ1 producing a first scanning light, the second reflective surfaces reflecting the light beam in an angle range larger than θ1 producing a second scanning light, the angles defined by the respective first reflective surface and second reflective surfaces with respect to a rotation axis of the polygon mirror each being different from another;
   a first fixed mirror accommodated within the housing, wherein the first fixed mirror reflects both the first scanning light and the second scanning light to an exterior of the housing through a read window to form a first scanning pattern for reading the encoded information in the information reading area, the first scanning pattern comprising more than one second scanning lines that are practically parallel with each other and a first scanning line that is practically parallel with the second scannings lines, the first scanning pattern including the first scanning line disposed between two of the second scanning lines, wherein the first scanning line comprises a trajectory depicted by the first scanning light reflected from the first fixed mirror in the information reading area while the second scanning lines comprise trajectories depicted by the second scanning light reflected from the first fixed mirror in the information reading area; and
   one or more second fixed mirrors disposed adjacent the first fixed mirror, wherein the second fixed mirrors reflect only the second scanning light to the exterior of the housing through the read window to form a second scanning pattern adjacent the first scanning pattern for reading the encoded information in the information reading area, the second scanning pattern comprising more than one third scanning lines that are practically parallel with each other, wherein the third scanning lines comprise trajectories depicted in the information reading area by the second scanning light reflected from the second fixed mirrors.

2. The barcode scanning device according to claim 1, wherein the first scanning pattern includes three or more second scanning lines.

3. The barcode scanning device according to claim 1, wherein the first scanning pattern includes the first scanning line which divides a space between the two of the second lines at even intervals.

4. The barcode scanning device according to claim 1, wherein at least one combination of the one or more second fixed mirrors is disposed symmetrically with respect to the first fixed mirror such that the second scanning pattern is formed of a combination of the third scanning lines inclined symmetrically with respect to the first scanning pattern, at least one of the more than one second reflective surfaces being a symmetric reflective surface that deflects the light beam incident thereto in an angle range symmetric with respect to an optical axis of the light beam, the other of the more than one second reflective surfaces being an asymmetric reflective surface that deflects the light beam incident thereto in an angle range asymmetric with respect to the optical axis of the light beam, wherein angles formed by the respective symmetric reflective surface and asymmetric reflective surface relative to a rotation axis of the polygon mirror are different from each other, whereby the combination of the third scanning lines having same lengths formed by the second scanning light reflected from the symmetric reflective surface is positioned inside of the third scanning lines having different lengths formed by the second scanning light reflected from the asymmetric reflective surface in the second scanning pattern.

5. A checkout system comprising:
   a checkout counter;
   a housing having a read window, the housing being vertically installed on the checkout counter;
   a light source emitting a light beam, the light source being accommodated within the housing;
   a polygon mirror rotatably accommodated within the housing, wherein the polygon mirror comprises a first reflective surface and more than one second reflective surfaces, the first reflective surface reflecting the light beam in an angle range of θ1 producing a first scanning light, the second reflective surfaces reflecting the light beam in an angle range larger than θ1 producing second scanning light, the angles that the respective first reflective surface and second reflective surface form with respect to a rotation axis of the polygon mirror each being different from another;
   a first fixed mirror accommodated within the housing, wherein the first fixed mirror reflects both the first scanning light and the second scanning light to exterior of the housing through a read window to form a first scanning pattern for reading encoded information such a barcode in an information reading area, the first scanning pattern comprising more than one second scanning lines that are practically parallel with each other and a first scanning line that is practically parallel with the second scanning lines, the first scanning pattern includes the first scanning line which divides a space between the two of the second lines at even intervals, wherein the first scanning line comprises a trajectory depicted by the first scanning light reflected from the first fixed mirror in the information reading area while the second scanning lines comprise trajectories depicted by the second scanning light reflected from the first fixed mirror in the information reading area; and one or more second fixed mirrors disposed adjacent the first fixed mirror, wherein the one or more second fixed mirrors reflect only the second scanning light to the exterior of the housing through the read window to form a second scanning pattern adjacent the first scanning pattern for reading encoded information such a barcode in the information reading area, the second scanning pattern comprising more than one third scanning lines that are practically parallel with each other, wherein the third scanning lines comprise trajectories depicted in the information reading area by the second scanning light reflected from the one or more second fixed mirrors.

6. The checkout system according to claim 5, wherein the first scanning light reflected from the first fixed mirror proceeds at an angle lower than a level.

7. The checkout system according to claim 5, wherein the first scanning pattern includes three or more second scanning lines.

8. The checkout system according to claim 5, wherein at least one combination of the one or more second fixed mirrors is disposed symmetrically with respect to the first fixed mirror such that the second scanning pattern is formed of a combination of the third scanning lines inclined symmetrically with respect to the first scanning pattern, at least one of the more than one second reflective surfaces being a symmetric reflective surface that deflects the light beam incident thereto in an angle range symmetric with respect to an optical axis of the light beam, the other of the more than one second reflective surfaces being an asymmetric reflective surface that deflects the light beam incident thereto in an angle range asymmetric with respect to the optical axis of the light beam, wherein angles formed by the respective symmetric reflective surface and asymmetric reflective surface relative to a rotation axis of the polygon mirror are different from each other, whereby the combination of the third scanning lines having same lengths formed by the second scanning light reflected from the symmetric reflective surface is positioned inside of the third scanning lines having different lengths formed by the second scanning light reflected from the asymmetric reflective surface in the second scanning pattern.

9. A method of forming a high-density scanning pattern using a barcode scanning device, which scans encoded information such as a barcode in an information reading area, comprising a light source, a polygon mirror having a first reflective surface and more than one second reflective surfaces, and a first fixed mirror and a second fixed mirror, said method comprising:

generating a light beam from the light source;

producing a first scanning light by reflecting the light beam from the first reflective surface of the polygon mirror in an angle range of θ1;

producing a second scanning light by reflecting the light beam from the second reflective surfaces of the polygon mirror in an angle range larger than θ1;

reflecting both of the first scanning light and the second scanning light from the first fixed mirror;

forming more than one second scanning lines derived from the second scanning light in the information reading area, the more than one second scanning lines being practically parallel with each other;

forming more than one first scanning lines derived from the first scanning light in the information reading area, the more than one first scanning lines being practically parallel with the second scanning lines, the first scanning lines being disposed between two of the second scanning lines;

reflecting the second scanning light from the second fixed mirror; and forming more than one third scanning lines derived from the second scanning light, the more than one third scanning lines being practically parallel with each other.

10. The method of forming a high density-scanning pattern according to claim 9, wherein the more than one second scanning lines are composed of three scanning lines.

11. The method of forming a high density-scanning pattern according to claim 9, wherein one of the first scanning lines divides a space between two of the second scanning lines at an even interval.

12. The method of forming a high density-scanning pattern according to claim 9, wherein, in the barcode scanning device, the second reflective surfaces of the polygon mirror comprises a symmetric reflective surface and an asymmetric reflective surface, and the second fixed mirror comprises more than one second fixed mirrors disposed symmetrically with respect to the first fixed mirror, the method further comprising:

forming a first combination of third scanning lines having the same gradients and different lengths from each other derived from the second scanning light through the asymmetric reflective surface and the second fixed mirror; and forming a second combination of third scanning lines having the same gradients and same lengths inside of the first combination of third scanning lines.

\* \* \* \* \*